United States Patent
Niu et al.

(10) Patent No.: US 9,721,496 B2
(45) Date of Patent: Aug. 1, 2017

(54) DISPLAY PANEL AND DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventors: Lei Niu, Shanghai (CN); Conghua Ma, Shanghai (CN); Zhihua Ling, Shanghai (CN); Jun Ma, Shanghai (CN); Tianyi Wu, Shanghai (CN); Sitao Huo, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 19 days.

(21) Appl. No.: 14/815,575

(22) Filed: Jul. 31, 2015

(65) Prior Publication Data

US 2016/0171926 A1    Jun. 16, 2016

(30) Foreign Application Priority Data

Dec. 16, 2014 (CN) .......................... 2014 1 0779289

(51) Int. Cl.
  *G09G 3/32* (2016.01)
  *H04N 13/04* (2006.01)
  *G09G 3/20* (2006.01)
  *G09G 3/00* (2006.01)

(52) U.S. Cl.
  CPC ................. *G09G 3/32* (2013.01); *G09G 3/20* (2013.01); *H04N 13/0454* (2013.01); *G09G 3/003* (2013.01); *G09G 2310/0267* (2013.01)

(58) Field of Classification Search
  CPC ... G09G 5/14; G09G 5/00; G09G 3/32; G06F 3/038
  See application file for complete search history.

(56) References Cited

U.S. PATENT DOCUMENTS

| | | | | |
|---|---|---|---|---|
| 2013/0235006 A1* | 9/2013 | Shin | ........................ | G09G 3/003 345/204 |
| 2013/0257925 A1* | 10/2013 | Kim | .................... | H04N 13/0434 345/691 |
| 2013/0271504 A1* | 10/2013 | Kim | ........................ | G09G 3/003 345/690 |

FOREIGN PATENT DOCUMENTS

| CN | 101329484 B | 12/2008 |
|---|---|---|
| CN | 102655599 A | 9/2012 |

* cited by examiner

*Primary Examiner* — Md Saiful A Siddiqui
(74) *Attorney, Agent, or Firm* — Faegre Baker Daniels LLP

(57) ABSTRACT

A display panel and a display device, where, the display panel includes a trigger signal controller, and the trigger signal controller is configured to convert N primary trigger signals generated by a first driving unit into 2N secondary trigger signals according to a display control signal generated by a second driving unit, and sequentially outputting the 2N secondary trigger signals to 2N gate controlling circuits, each of the 2N gate controlling circuits is configured to drive a group of pixels in a display region, where, rows of pixels respectively from different groups of pixels are alternately arranged, the secondary trigger signals are configured to control gate controlling circuits to simultaneously drive two paired groups of pixels under a first display mode, and alternately drive two paired groups of pixels under a second display mode.

16 Claims, 14 Drawing Sheets

--Prior Art--

--Prior Art--

DISPLAY PANEL AND DISPLAY DEVICE

CROSS-REFERENCE TO RELATED APPLICATION

This application claims priority to Chinese Application No. 201410779289.1, filed Dec. 16, 2014, which is herein incorporated by reference in its entirety.

TECHNICAL FIELD

The present disclosure relates to the field of display technologies and, in particular, to a display panel and a display device.

BACKGROUND

In comparison with general Two Dimensional (2D) picture display technologies, Three Dimensional (3D) display technologies can make a stereo and vivid picture without restricting images onto the plane of a screen, so that the scene appears to be presented to outside of the screen, giving a personal experience to audiences. Based on this, the 3D technologies have developed rapidly, and display panels that can achieve interconversion between a 2D picture and a 3D picture have been provided.

In the related art, for a display panel only displaying a 2D picture, an existing Integrated Circuit (IC) can provide a drive for the display of the 2D picture. However, for a Horizontally Double Density Pixel (HDDP) display panel, to ensure that the 2D picture and the 3D picture have the same resolution, the resolution is needed to be doubly increased in a single direction (such as, a long side direction or a short side direction of the panel), such that the existing integrated circuit cannot provide a drive for the display of both the 2D picture and 3D picture.

SUMMARY

In view of the above, embodiments of the disclosure provide a display panel and a display device, to solve technical problems in the related art that: the existing integrated circuit cannot provide a drive for the display of both the 2D picture and 3D picture in order to ensure that the 2D picture and the 3D picture have the same resolution.

In a first example, embodiments of the disclosure provide a display panel, including: a display region and a peripheral region surrounding the display region, where, the display region comprises pixels arranged in an n×m array for displaying a picture, wherein n and m both are positive integers, the peripheral region comprises a first driving unit, gate controlling circuits, a second driving unit and a trigger signal controller;

the first driving unit is configured to generate N primary trigger signals, wherein N is a positive integer;

the second driving unit is configured to generate a display control signal, and further configured to provide a corresponding data signal for each row of pixels; and the trigger signal controller is configured to convert the N primary trigger signals generated by the first driving unit into 2N secondary trigger signals according to the display control signal, and sequentially outputting the 2N secondary trigger signals to 2N gate controlling circuits, each of the 2N gate controlling circuits is configured to drive a group of pixels in the display region, wherein, rows of pixels respectively from different groups of pixels are alternately arranged, the secondary trigger signals are configured to control the gate controlling circuits to simultaneously drive two paired groups of pixels under a first display mode, and alternately drive two paired groups of pixels under a second display mode.

In a second example, embodiments of the invention further provide a display device, including the display panel of the above first example.

With the display panel and the display device, according to embodiments of the disclosure, by providing the trigger signal controller in the display panel, in the case that the primary trigger signal is generated by an ordinary integrated controlling circuit, the trigger signal controller can convert N primary trigger signals into 2N secondary trigger signals, these secondary trigger signals can enable the gate controlling circuits to drive corresponding groups of pixels, and simultaneously drive two paired groups of pixels under a first display mode, and alternately drive two paired groups of pixels under a second display mode, so that the display panel can have the same resolution under the first display mode and the second display mode.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

Other features, objects and advantages of the disclosure will become apparent from the following detailed description and the accompanying drawings, in which.

Figure 1:
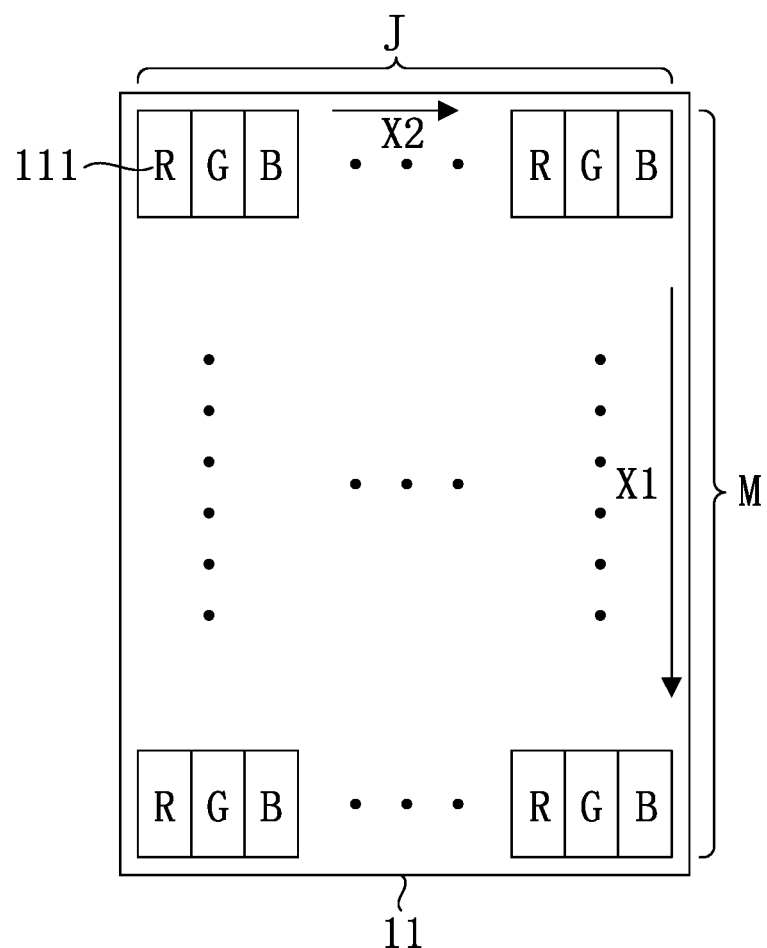
FIG. 1 is a schematic diagram of the structure of a display panel for displaying a 2D picture in the related art.

While the disclosure is amenable to various modifications and alternative forms, embodiments have been shown by way of example in the drawings and are described in detail below. The intention, however, is not to limit the disclosure to the embodiments described. On the contrary, the disclosure is intended to cover all modifications, equivalents, and alternatives falling within the scope of the disclosure as defined by the appended claims.

DETAILED DESCRIPTION

The present disclosure will be further described in detail below in conjunction with the accompanying drawings and embodiments. It may be understood that embodiments described herein are merely for explaining the disclosure rather than limiting the disclosure. Additionally, it is noted that merely partial contents associated with the disclosure rather than all contents are illustrated in the accompanying drawings for ease of description.

At present, display panels for displaying 2D pictures are still used mostly. As shown in FIG. 1, a display panel 11 for displaying a 2D picture includes M pixels 111 arranged along a long side direction X1 of the display panel and J pixels 111 arranged along a short side direction X2 of the display panel, where, M and J both are positive integers, and R, G and B in FIG. 1 represent a red pixel, a green pixel and a blue pixel as three primary colors pixels, respectively. It can be seen from FIG. 1 that a resolution of the display panel 11 is a product of M and J.

With the development of the display technologies, display panels for displaying 3D pictures have been provided, and even some display panels such as an HDDP display panel can display both 2D pictures and 3D pictures. The operating principle of the above display panels for displaying 3D pictures is that: the same picture is displayed as a left eye picture and a right eye picture, respectively, and the left eye picture and right eye picture are displayed by different pixels, so that the left eye of a viewer receives the left eye picture and the right eye of the viewer receives the right eye picture, and the display effect of the 3D picture is achieved by a time difference between the left eye picture and the right eye picture.

Figure 2:
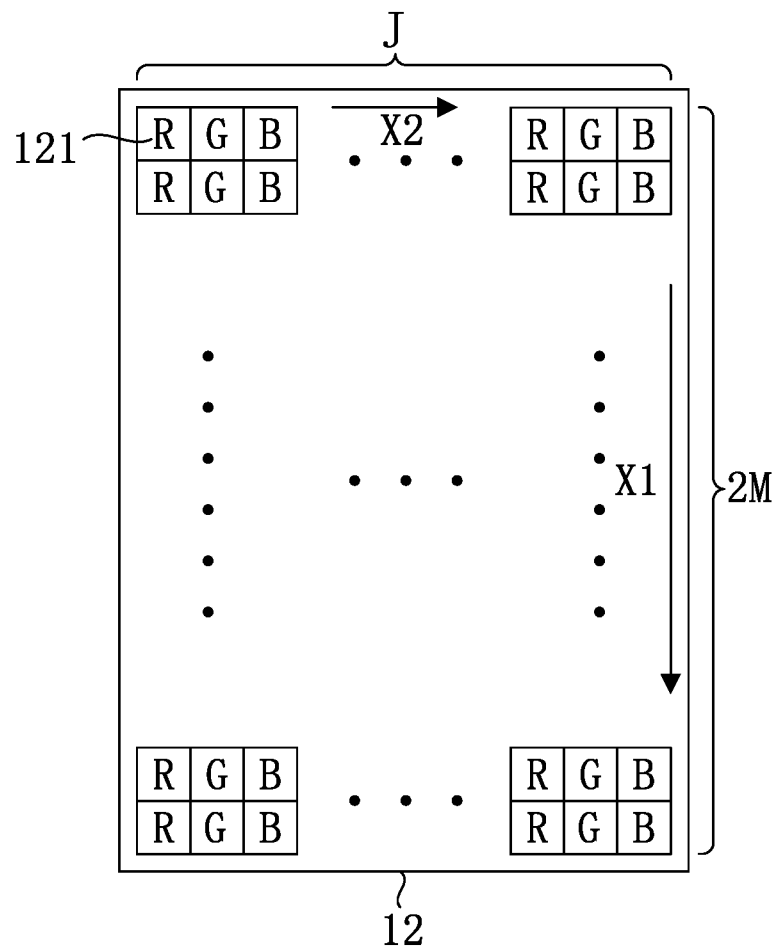
FIG. 2 is a schematic diagram of the structure of an HDDP panel in the related art.

For the HDDP display panel, in order to achieve that the 2D picture and 3D picture have the same resolution, the resolution is needed to be doubly increased in a signal direction of the display panel (such as a long side direction or a short side direction of the display panel). As shown in FIG. 2, in comparison with the display panel shown in FIG. 1, the number of pixels 121 of the HDDP display panel 12 along its long side direction X1 is doubly increased, i.e. enabling 2M pixels, and correspondingly, the resolution of the HDDP display panel along its long side direction is also doubly increased. When the HDDP display panel displays a 3D picture, since the left eye picture and the right eye picture need to be presented respectively by two adjacent rows of pixels 121 arranged along a long side direction X1 of the display panel, the resolution of the 3D picture is a product of M and J; when the HDDP display panel displays a 2D picture, in order to keep the resolution of the 2D picture same with the resolution of the 3D picture, the same picture needs to be presented by two adjacent rows of pixels 121 arranged along the long side direction X1 of the display panel, so that the resolution of the 2D picture is also a product of M and J.

The existing integrated control circuit can be configured for driving a display panel for only displaying 2D picture. However, the HDDP display panel needs to display both 2D picture and 3D picture in the same resolution, i.e. when displaying a 2D picture, two adjacent rows of pixels need to be driven to present the same picture, and when displaying a 3D picture, two adjacent rows of pixels need to be respectively driven to present the left eye picture and the right eye picture, such that the existing integrated control circuit cannot be configured for driving corresponding displays of the 2D picture and 3D picture.

In view of the above, embodiments of the disclosure provide solutions as follows.

Figure 3:
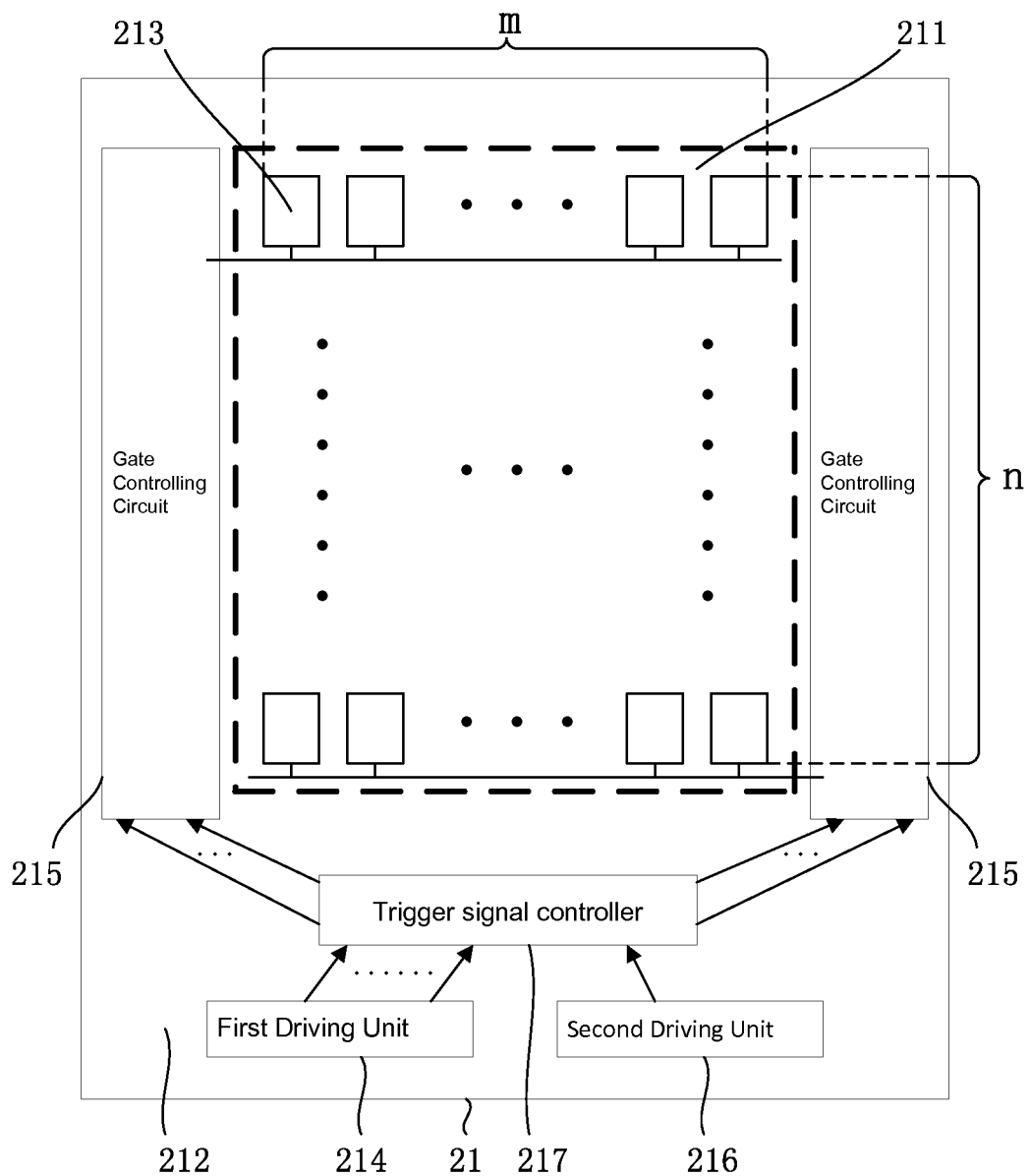
FIG. 3 is a schematic diagram of the structure of a display panel, according to embodiments of the disclosure.

Embodiments of the disclosure provide a display panel. FIG. 3 is a schematic diagram of the structure of the display panel, according to embodiments of the disclosure. As shown in FIG. 3, the display panel 21 includes: a display region 211 and a peripheral region 212 surrounding the display region 211, where, the display region 211 includes pixels arranged in an n×m array for displaying a picture (i.e. an array including n rows of pixels and m columns of pixels), n and m both are positive integers, the peripheral region 212 includes a first driving unit 214, gate controlling circuits 215, a second driving unit 216 and a trigger signal controller 217; the first driving unit 214 is configured to generate N primary trigger signals, where, N is a positive integer; the second driving unit 216 is configured to generate a display control signal and further configured to provide a corresponding data signal for each row of pixels; the trigger signal controller 217 is configured to convert N primary trigger signals generated by the first driving unit 214 into 2N secondary trigger signals according to the display control signal, and sequentially output the 2N secondary trigger signals to 2N gate controlling circuits 215, each of the 2N gate controlling circuits is configured to drive a corresponding group of pixels in the display region, where, rows of pixels respectively from 2N group of pixels are alternately arranged and each adjacent two thereof are further grouped as a pair of pixel rows, the secondary trigger signals are configured to control gate controlling circuits 215 to simultaneously drive two rows of pixels from the pair of pixel rows under a first display mode, and alternately drive two rows of pixels from the pair of pixel rows under a second display mode.

It is noted that, the trigger signal controller 217 may convert N primary trigger signals generated by the first drive unit 214 into 2N secondary trigger signals, in which, the trigger signal controller selectively outputs the inputted primary trigger signals for different control periods of the display control signal to obtain the secondary trigger signals. In some embodiments, all of the secondary trigger signals can be regarded as signals that are selectively outputted by the trigger signal controller for different control periods of the display control signals. Additionally, the above first driving unit 214 can be implemented with the existing integrated controlling circuit and the above second driving unit 216 can be implemented with the existing software or hardware which can implement functions corresponding to the existing integrated controlling circuit.

Figure 4A:
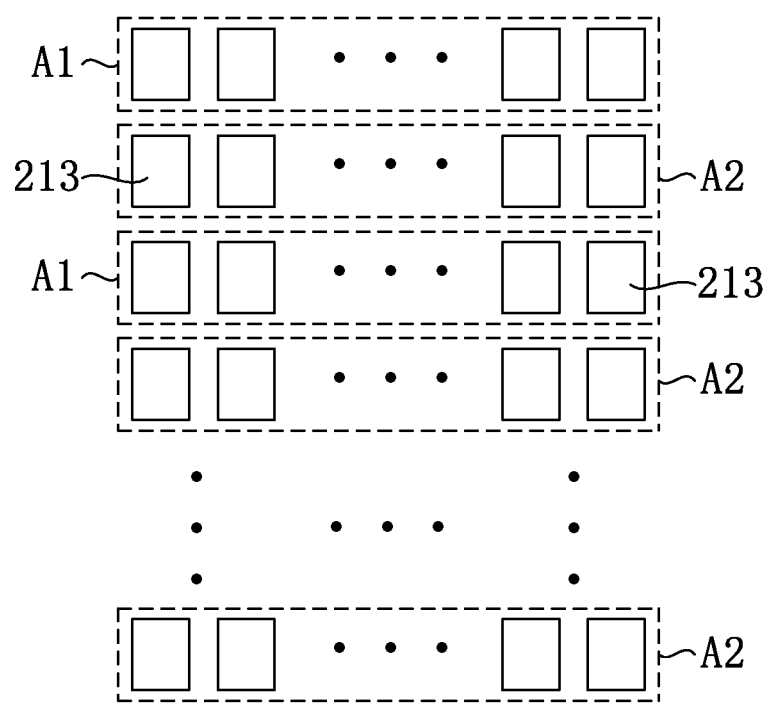
FIG. 4A is a schematic diagram of the structure of a pixels grouping, according to embodiments of the disclosure.
Figure 4B:
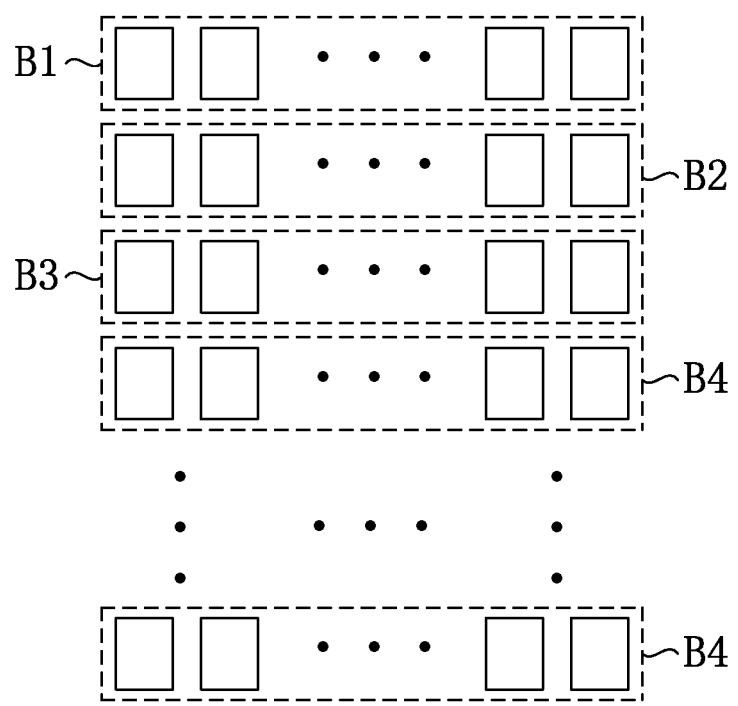
FIG. 4B is a schematic diagram of the structure of another pixel grouping, according to embodiments of the disclosure.

The above group of pixels and alternate arrangement of rows of pixels in different groups of pixels are further illustrated in combination with accompanying figures. As shown in FIG. 4A, all pixels 213 of the display panel are grouped into two groups of pixels, i.e. a first group of pixels A1 and a second group of pixels A2, where, odd rows of pixels are pixels from the first group of pixels A1, even rows of pixels are pixels from the second group of pixels A2, and hence rows of pixels respectively from the two groups of pixels are alternately arranged, i.e. a certain row of second group of pixels A2 is sandwiched between any two adjacent rows from the first group of pixels A1, and a certain row of first group of pixela A1 is sandwiched between any two adjacent rows from the second groups of pixels A2. Alternatively, in another manner of grouping pixels, as shown in FIG. 4B, all pixels 213 of the display panel are grouped into four groups of pixels, i.e. a first group of pixels B1, a second group of pixels B2, a third group of pixels B3 and a fourth group of pixels B4, where, all of the first, fifth, ninth, . . . , (4j−3)-th, . . . , and (n−3)-th rows of pixels belong to the first group of pixels B1, all of the second, sixth, tenth, . . . , (4j−2)-th, . . . , and (n−2)-th rows of pixels belong to the second group of pixels B2, all of the third, seventh, eleventh, . . . , (4j−1)-th, . . . , and (n−1)-th rows of pixels belong to the third group of pixels B3, and all of the fourth, eighth, twelfth, . . . , 4j-th, . . . , and n-th rows of pixels belong to the fourth group of pixels B4, where j is a positive integer, and $1 \leq j \leq n/4$. As can be known from FIG. 4B, the rows of pixels respectively from the four groups of pixels are alternately arranged, that is, the first group of pixels B1 to the fourth group of pixels B4 are arranged sequentially and periodically along a column direction in order to form all rows of pixels of the display panel. In the above, all pixels of the display panel are grouped into two groups of pixels or four groups of pixels, for example, and if all pixels are grouped into more-numbered groups of pixels, similarly the rows of pixels respectively from the different groups of pixels are alternately arranged.

In some embodiments of the disclosure, the first display mode may be a 2D display mode, and the second display mode may be a 3D display mode. In other words, the display panel may implement conversion between the 2D display mode and the 3D display mode.

It is noted in FIG. 3 that the gate controlling circuit 215 may be provided in the peripheral region 212 at two sides of the display region 211 or may be also provided in the peripheral region 212 at one side of the display region 211, which is not limited thereto. Examples are given for configuration of the gate controlling circuit according to some embodiments, and configuration location of the gate controlling circuit is not limited thereto.

By providing the trigger signal controller 217 in the display panel, the trigger signal controller 217 can convert, according to the display control signal generated by the second driving unit 216, N primary trigger signals generated by the first driving unit 214 into 2N secondary trigger signals, which are configured to respectively drive 2N gate controlling circuits 215 so that the gate controlling circuits 215 simultaneously drive two paired groups of pixels under the first display mode (for example, the 2D display mode) and alternately drive two paired groups of pixels under the second display mode (for example, the 3D display mode). In the case that the first driving unit 214 is implemented with an ordinary integrated controlling circuit, a trigger signal controller is provided in the display panel and configured to generate a secondary trigger signal, to enable each of the gate controlling circuits drive each group of pixels corresponding thereto, so that the resolution under the first display mode is the same as that under the second display mode. Additionally, in comparison with the combination of the Field Programmable Gate Array (FPGA) and buffer to achieve a Timing Control (T-CON) function so that the resolution under the first display mode is the same as that under the second display mode, embodiments of the disclosure combine the ordinary integrated controlling circuit with the trigger signal controller, thereby reducing hardware cost.

Further, the display control signal can include a first control signal and a second control signal; further, the first control signal may be a 2D/3D control signal, and the second control signal may be a left/right control signal. It is noted that the 2D/3D control signal can be configured to control conversion between the 2D display mode and the 3D display mode, and the left/right eye control signal can be configured to control under the 3D display mode to display a left eye picture and a right eye picture.

Figure 5:
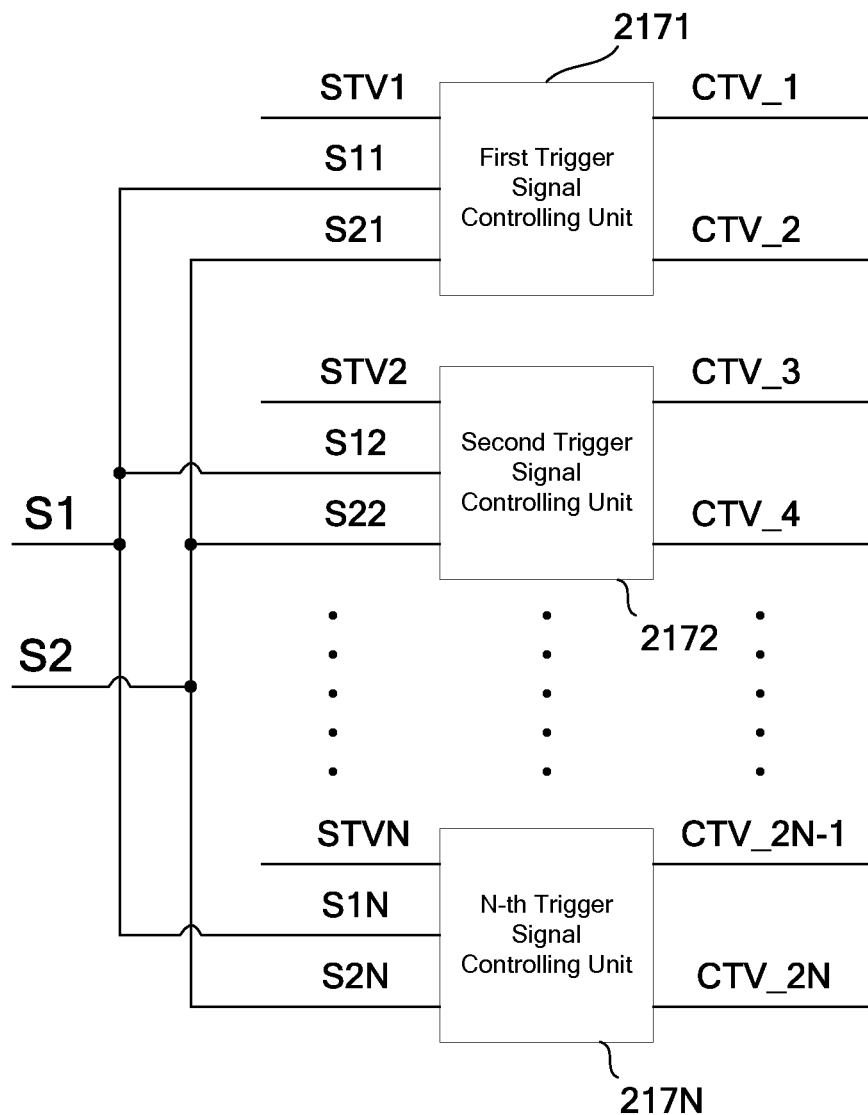
FIG. 5 is a schematic diagram of the structure of a trigger signal controller, according to embodiments of the disclosure.

As described above, the trigger signal controller can convert N primary trigger signals into 2N secondary trigger signals. Based on this, as shown in FIG. 5, the trigger signal controller can include N trigger signal controlling units (2171-217N), and each of the N trigger signal controlling units can convert one of the N primary trigger signal into two of the 2N secondary trigger signals according to the first control signal and the second control signal, where, the trigger signal controlling unit includes: a first control signal inputting terminal for inputting the first control signal, a second control signal inputting terminal for inputting the second control signal, a primary trigger signal inputting terminal for inputting the primary trigger signal, a first secondary trigger signal outputting terminal for outputting a first secondary trigger signal and a second secondary trigger signal outputting terminal for outputting a second secondary trigger signal; if N is larger than 1, the first control signal inputting terminal (respectively corresponding to S11-S1N) of each of the trigger signal controlling units is electrically connected together with each other to function as the first control signal inputting terminal S1 of the trigger signal controller, the second control signal inputting terminal (respectively corresponding to S21-S2N) of each of the trigger signal controlling units is electrically connected together with each other to function as the second control signal inputting terminal S2 of the trigger signal controller; the primary trigger signal inputting terminal of each of the trigger signal controller units functions as a corresponding primary trigger signal inputting terminal (respectively corresponding to STV1-STVN) of the trigger signal controller, both the first secondary trigger signal outputting terminal and the second secondary trigger signal outputting terminal of each of the trigger signal controlling units function as a corresponding secondary trigger signal outputting terminals (respectively corresponding to CTV_1-CTV_2N) of the trigger signal controller.

Figure 6:
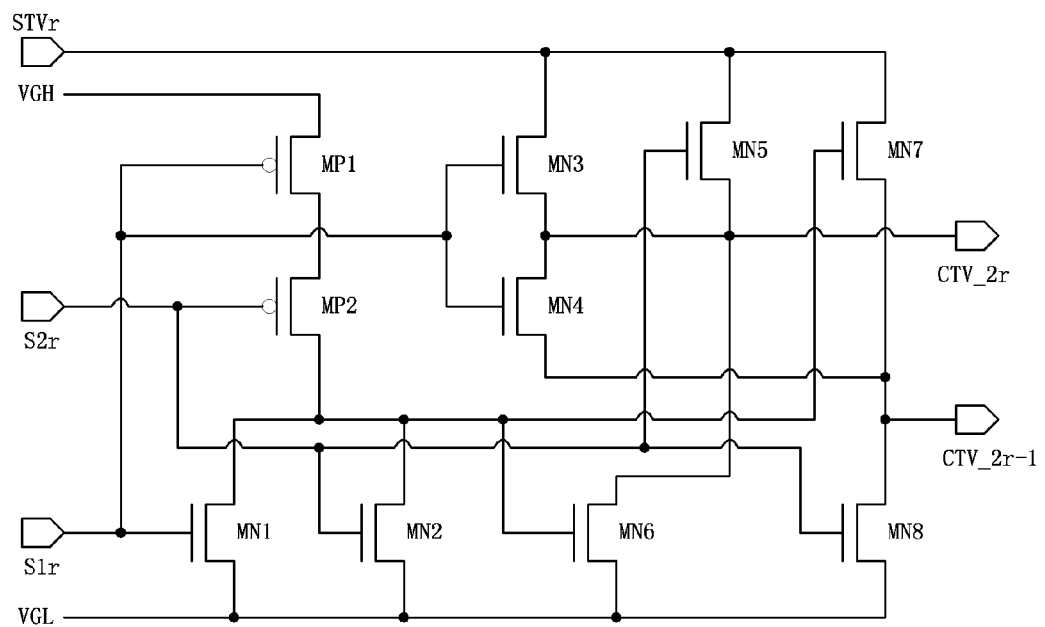
FIG. 6 is a schematic diagram of the circuit structure of a trigger signal controlling unit, according to embodiments of the disclosure.

In some embodiments of the disclosure, as shown in FIG. 6, each of the trigger signal controlling units can further include: a first PMOS transistor MP1, a second PMOS transistor MP2, a first NMOS transistor MN1, a second NMOS transistor MN2, a third NMOS transistor MN3, a fourth NMOS transistor MN4, a fifth NMOS transistor MN5, a sixth NMOS transistor MN6, a seventh NMOS transistor MN7, an eighth NMOS transistor MN8, a first level signal inputting terminal VGH for receiving a high level signal and a second level signal inputting terminal VGL for receiving a low level signal; a gate electrode of the first PMOS transistor MP1 is electrically connected with the first control signal inputting terminal S1r, a source electrode of the first PMOS transistor MP1 is electrically connected with the first level signal inputting terminal VGH, and a drain electrode of the first PMOS transistor MP1 is electrically connected with a source electrode of the second PMOS transistor MP2; a gate electrode of the second PMOS transistor MP2 is electrically connected with the second control signal inputting terminal S2r, and a drain electrode of the second PMOS transistor MP2 is electrically connected with the drain electrode of the first NMOS transistor MN1; a gate electrode of the first NMOS transistor MN1 is electrically connected with the first control signal inputting terminal S1r, and a source electrode of the first NMOS transistor MN1 is electrically connected with the second level signal inputting terminal VGL; a gate electrode of the second NMOS transistor MN2 is electrically connected with the second control signal inputting terminal S2r, a drain electrode of the second NMOS transistor MN2 is electrically connected with the drain electrode of the first NMOS transistor MN1, and a source electrode of the second NMOS transistor MN2 is electrically connected with the second level signal inputting terminal VGL; a gate electrode of the third NMOS transistor MN3 is electrically connected with the first control signal inputting terminal S1r, a source electrode of the third NMOS transistor MN3 is electrically connected with the second secondary trigger signal outputting terminal CTV_2r, and a drain electrode of the third NMOS transistor MN3 is electrically connected with the primary trigger signal inputting terminal STVr; a gate electrode of the fourth NMOS transistor MN4 is electrically connected with the first control signal inputting terminal S1r, a source electrode of the fourth NMOS transistor MN4 is electrically connected with the first secondary trigger signal outputting terminal CTV_2r-1, and a drain electrode of the fourth NMOS transistor MN4 is electrically connected with the second secondary trigger signal outputting terminal CTV_2r; a gate electrode of the fifth NMOS transistor MN5 is electrically connected with the second control signal inputting terminal S2r, a source electrode of the fifth NMOS transistor MN5 is electrically connected with the second secondary trigger signal outputting terminal CTV_2r, and a drain electrode of the fifth NMOS transistor MN5 is electrically connected with the primary trigger signal inputting terminal STVr; a gate electrode of the sixth NMOS transistor MN6 is electrically connected with the drain electrode of the first NMOS transistor MN1, a source electrode of the sixth NMOS transistor MN6 is electrically connected with the second level signal inputting terminal VGL, and a drain electrode of the sixth NMOS transistor MN6 is electrically connected with the second secondary trigger signal outputting terminal CTV_2r; a gate electrode of the seventh NMOS transistor MN7 is electrically connected with the drain electrode of the first NMOS transistor MN1, a source electrode of the seventh NMOS transistor MN7 is electrically connected with the first secondary trigger signal outputting terminal CTV_2r-1, and a drain electrode of the seventh NMOS transistor MN7 is electrically connected with the primary trigger signal inputting terminal STVr; a gate electrode of the eighth NMOS transistor MN8 is electrically connected with the second control signal inputting terminal S2r, a source electrode of the eighth NMOS transistor MN8 is electrically connected with the second level signal inputting terminal VGL, and a drain electrode of the eighth NMOS transistor MN8 is electrically connected with the first secondary trigger signal outputting terminal CTV_2r-1.

Figure 7A:
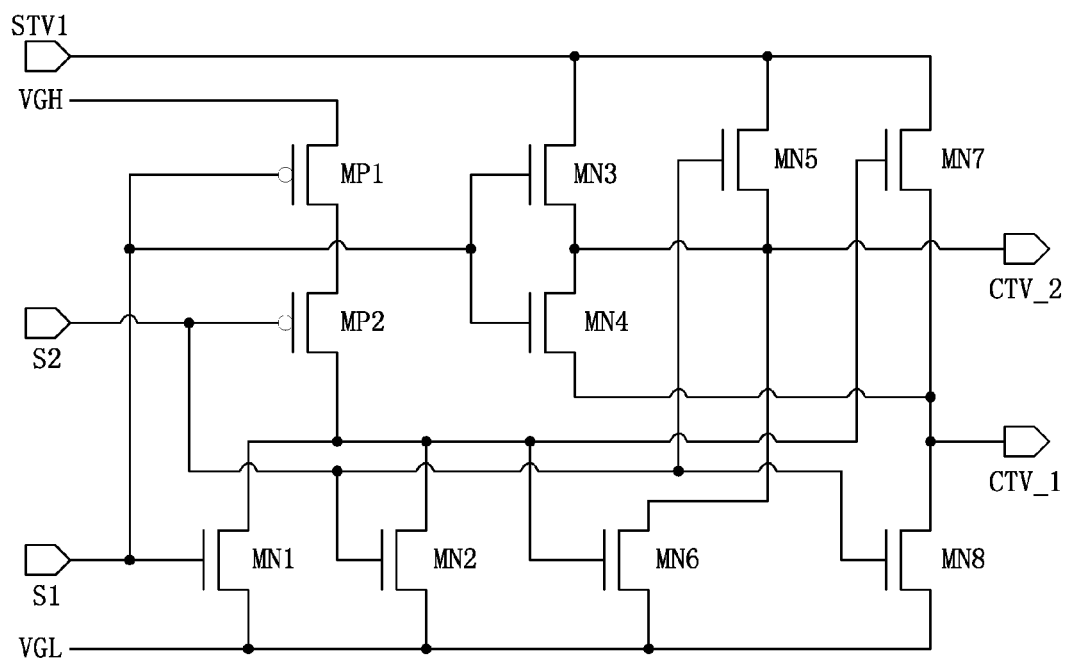
FIG. 7A is a schematic diagram of the circuit structure of a trigger signal controller, according to embodiments of the disclosure.
Figure 7B:
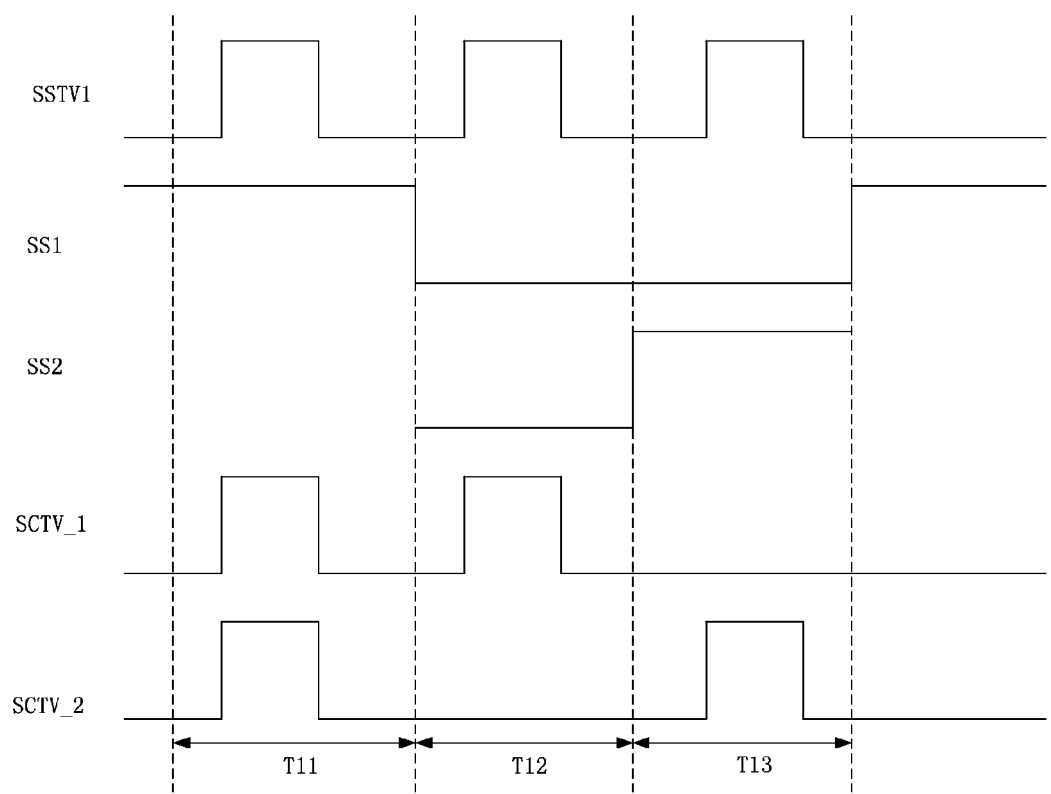
FIG. 7B is a timing diagram of various signals shown in FIG. 7A.

On the basis of the trigger signal controlling units shown in FIG. 6, as shown in FIG. 7A, the trigger signal controller includes one trigger signal controlling unit, where, STV1 represents a primary trigger signal inputting terminal, CTV_1 represents a first secondary trigger signal outputting terminal and CTV_2 represent a second secondary trigger signal outputting terminal. FIG. 7B is a timing diagram of various signals shown in FIG. 7A. In FIG. 7B, SSTV1 represents the primary trigger signal inputted to the trigger signal controller; SS1 represents the first control signal inputted to the trigger signal controller; SS2 represents the second control signal inputted to the trigger signal controller; SCTV_1 represents the first secondary trigger signal outputted from the trigger signal controller; and SCTV_2 represents the second secondary trigger signal outputted from the trigger signal controller. The operating principle of the trigger signal controller in FIG. 7A is further illustrated below in combination with FIG. 7B.

As shown in FIGS. 7A and 7B, operating states of the trigger signal controller comprise:

In a picture displaying phase T11 under a first display mode, a first control signal SS1 having a high level is applied to the first control signal inputting terminal S1 of the trigger signal controller, and the second control signal inputting terminal S2 of the trigger signal controller is floated (no level is applied to the second control signal SS2 during the phase), so that both the third NMOS transistor MN3 and the fourth NMOS transistor MN4 are turned on, the primary trigger signal SSTV1 is transmitted to the second secondary trigger signal outputting terminal CTV_2 via the third NMOS transistor MN3 to output as a second secondary trigger signal SCTV_2, and the primary trigger signal SSTV1 is transmitted to the first secondary trigger signal outputting terminal CTV_1 via both the third NMOS transistor MN3 and the fourth NMOS transistor MN4 to output as a first secondary trigger signal SCTV_1.

In a first picture displaying phase T12 under a second display mode, a first control signal SS1 having a low level is applied to the first control signal inputting terminal S1 of the trigger signal controller, and a second control signal SS2 having a low level is applied to the second control signal inputting terminal S2 of the trigger signal controller, so that both the first PMOS transistor MP1 and the second PMOS transistor MP2 are turned on, the high level signal received by the first level signal inputting terminal VGH is applied to the gate electrode of the seventh NMOS transistor MN7 via both the first PMOS transistor MP1 and the second PMOS transistor MP2 to turn on the seventh NMOS transistor MN7, and the primary trigger signal SSTV1 is transmitted to the first secondary trigger signal outputting terminal CTV_1 via the seventh NMOS transistor MN7 to output as a first secondary trigger signal SCTV_1.

In a second picture displaying phase T13 under the second display mode, a first control signal SS1 having a low level is applied to the first control signal inputting terminal S1 of the trigger signal controller, and a second control signal S2 having a high level is applied to the second control signal inputting terminal SS2 of the trigger signal controller, so that the fifth NMOS transistor MN5 is turned on, and the primary trigger signal SSTV1 is transmitted to the second secondary trigger signal outputting terminal CTV_2 via the fifth NMOS transistor MN5 to output as a second secondary trigger signal SCTV_2.

It is noted that the primary trigger signals in the different phases refer to active primary trigger signals, i.e. the active primary trigger signals are primary trigger signals in a high level status.

It can be seen from the description of the operating principle of the trigger signal controller in FIG. 7A that the first secondary trigger signal SCTV_1 and the second secondary trigger signal SCTV_2 are simultaneously outputted in the picture displaying phase T11 under the first display mode, while only the first secondary trigger signal SCTV_1 is outputted in the first picture displaying phase T12 under the second display mode, and only the second secondary trigger signal SCTV_2 is outputted in the second picture displaying phase T13 under the second display mode.

Figure 8:
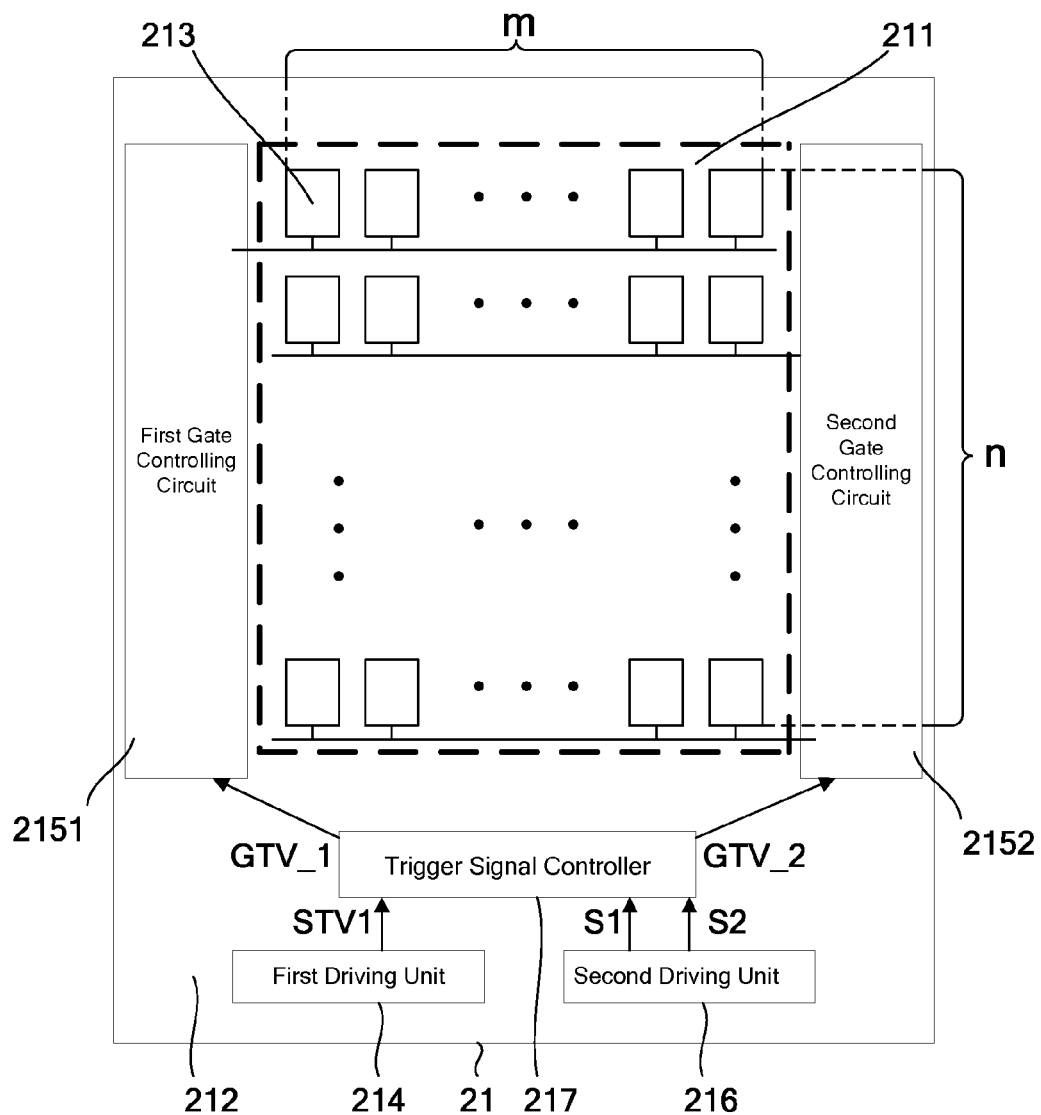
FIG. 8 is a schematic diagram of the structure of another display panel, according to embodiments of the disclosure.

In FIG. 7A, the trigger signal controller converts one primary trigger signal into two secondary trigger signals and output two secondary trigger signals, and thus the peripheral region includes two gate controlling circuits electrically connected with the trigger signal controller 217 in the display panel as shown in FIG. 8, i.e. a first gate controlling circuit 2151 and a second gate controlling circuit 2152; the first gate controlling circuit 2151 can be configured to drive a group of pixels consisted of all of the first, third, . . . , (2i−1)-th, . . . , and (n−1)-th rows of pixels 213, and the second gate controlling circuit 2152 can be configured to drive a group of pixels consisted of all of the second, fourth, . . . , 2i-th, . . . , and n-th rows of pixels, where, i is a positive integer, and 1≤i≤n/2; the first gate controlling circuit 2151 is driven by the first secondary trigger signal (outputted by the first secondary trigger signal outputting terminal CTV_1), and the second gate controlling circuit 2152 is driven by the second secondary trigger signal (outputted by the second secondary trigger signal outputting terminal CTV_2).

It is noted that the distribution configuration of the group of pixels consisting of all of the first, third, . . . , (2i−1)-th, . . . , and (n−1)-th rows of pixels and the group of pixels consisting of all of the second, fourth, . . . , 2i-th, . . . , and n-th rows of pixels in the display region of the display panel may refer to FIG. 4A and the related descriptions, which is not repeatedly discussed herein again.

Additionally, in the gate controlling circuits disposed corresponding to the trigger signal controller in FIG. 7A, additional circuit leads are not involved, thus not increasing the border area in the peripheral region of the display panel.

Further, operating states of the gate controlling circuit in FIG. 8 (corresponding to operating states of the trigger signal controller in FIG. 7B) includes that: in the picture displaying phase T11 under the first display mode, the first secondary trigger signal and the second secondary trigger signal generated by the trigger signal controller simultaneously enable the first gate controlling circuit 2151 and the second gate controlling circuit 2152, respectively, to drive the (2i−1)-th row and the 2i-th row of pixels among the two groups of pixels respectively electrically connected with the first gate controlling circuit 2151 and the second gate controlling circuit 2152 to display the same picture under the first display mode.

It can be known from the operating principle of the gate controlling circuits that the gate controlling circuits start to generate scanning signals configured for sequentially driving each row of pixels after the gate controlling circuits have received the secondary trigger signals (herein referring to the active secondary trigger signals). The first gate controlling circuit 2151 sequentially drives a first row of pixels, a third row of pixels, a fifth row of pixels the (2i−1)-th row of pixels, and so on (i.e., all of the odd-numbered rows of pixels), and the second gate controlling circuit 2152 sequentially drives a second row of pixels, a fourth row of pixels, a sixth row of pixels the 2i-th row of pixels, and so on (i.e., all of the even-numbered rows of pixels). Since the first secondary trigger signal for driving the first gate controlling circuit 2151 and the second secondary trigger signal for driving the second gate controlling circuit 2152 are generated simultaneously in the picture displaying phase T11 under the first display mode, the first gate controlling circuit 2151 drives the first row of pixels and simultaneously the second gate controlling circuit 2152 drives the second row of pixels, and the same data signal are inputted to the first row of pixels and the second row of pixels in order to display the same picture under the first display mode; and then, the first gate controlling circuit 2151 and the second gate controlling circuit 2152 simultaneously drive the third row of pixels and the fourth row of pixels, respectively, and the same data signal is inputted to the third row of pixels and the fourth row of pixels in order to display the same picture under the first display mode, and so on, until all of rows of pixels have been driven and a frame of picture under the first display mode has been displayed. As described above, the (2i−1)-th row and the 2i-th row of pixels among the two groups of pixels respectively electrically connected with the first gate controlling circuit 2151 and the second gate controlling circuit 2152 present the same picture under the first display mode, and thus the resolution of the display panel under the first display mode is m×n/2.

In the first picture displaying phase T12 under the second display mode, the first secondary trigger signal generated by the trigger signal controller enables the first gate controlling circuit 2151 to drive the group of pixels electrically connected with the first gate controlling circuit 2151 to display a first picture; in the second picture displaying phase T13 under the second display mode, the second secondary trigger signal generated by the trigger signal controller enables the second gate controlling circuit 2152 to drive the group of pixels electrically connected with the second gate controlling circuit 2152 to display a second picture. It is noted that if the second display mode is a 3D display mode, the first picture may be a left eye picture and the second picture may be a right eye picture; or the first picture may be a right eye picture and the second picture may be a left eye picture.

In the first picture displaying phase T12 under the second display mode, the first gate controlling circuit 2151 sequentially drives a first row of pixels, a third row of pixels, a fifth row of pixels . . . , the (2i−1)-th row of pixels, and so on, (i.e., all of the odd-numbered rows of pixels) to display the first picture; in the second picture displaying phase T13 under the second display mode, the second gate controlling circuit 2152 sequentially drives a second row of pixels, a fourth row of pixels, a sixth row of pixels, the 2i-th row of pixels, and so on (i.e., all of the even-numbered rows of pixels), to display the second picture. Since the first picture and the second picture have the same display content and together form the display picture under the second display mode, the resolution of the display panel under the second display mode is m×n/2, which is the same as that of the display panel under the first display mode. If the first display mode is a 2D display mode and the second display mode is a 3D display mode, the display panel, according to embodiments of the disclosure, can have the same resolution under the first display mode and the second display mode or under the 2D display mode and the 3D display mode.

Figure 9A:
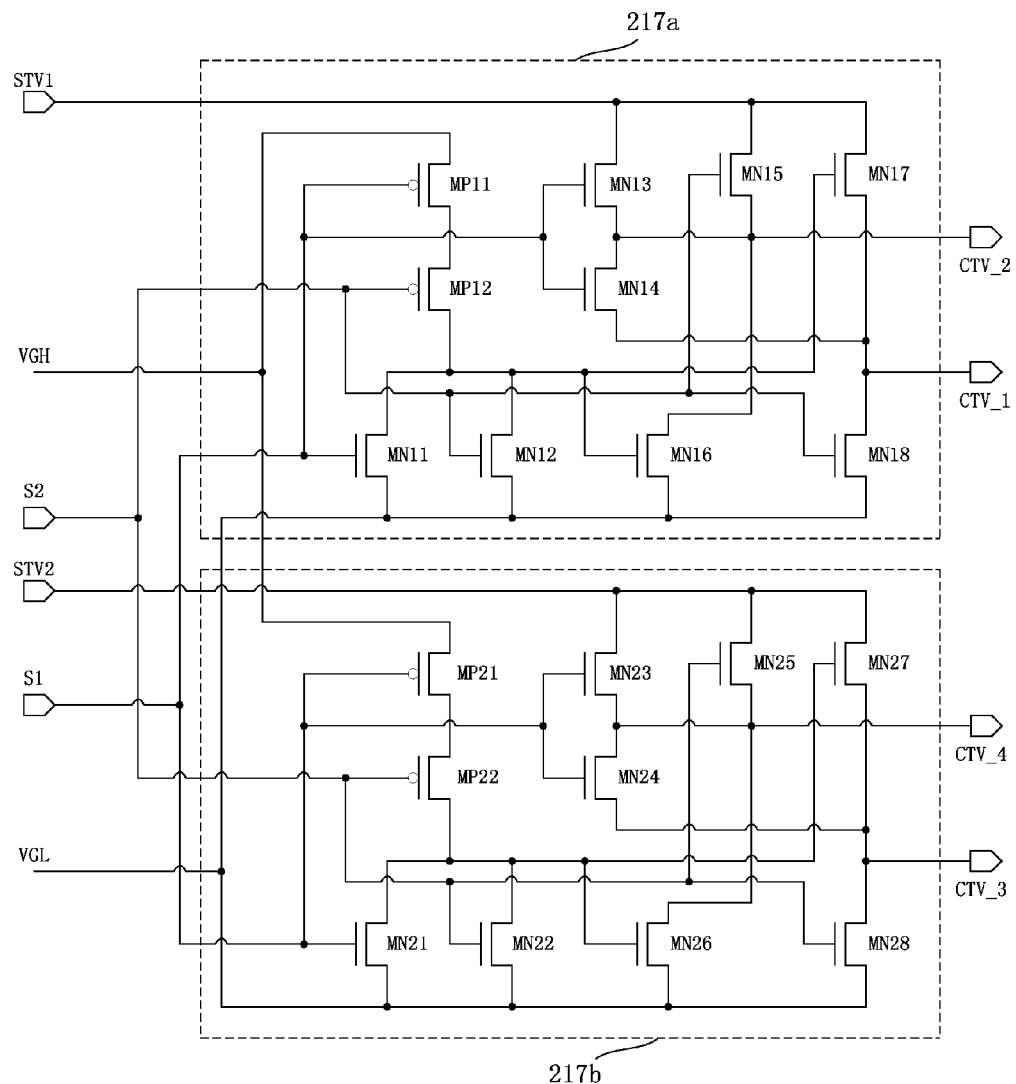
FIG. 9A is a schematic diagram of the circuit structure of another trigger signal controller, according to embodiments of the disclosure.

FIG. 7A shows one example of the trigger signal controller. In another example, the trigger signal controller can convert two primary trigger signals into four secondary trigger signals. As shown in FIG. 9A, the trigger signal controller includes two trigger signal controlling units, i.e. a first trigger signal controlling unit 217a and a second trigger signal controlling unit 217b, where, a primary trigger signal inputting terminal of the first trigger signal controlling unit 217a and a primary trigger signal inputting terminal of the second trigger signal controlling unit 217b function as a first primary trigger signal inputting terminal STV1 and a second primary trigger signal inputting terminal STV2 of the trigger signal controller respectively, two secondary trigger signal outputting terminals of the first trigger signal controlling unit 217a and two secondary trigger signal outputting terminals of the second trigger signal controlling unit 217b sequentially function as a first secondary trigger signal outputting terminal CTV_1, a second secondary trigger signal outputting terminal CTV_2, a third secondary trigger signal outputting terminal CTV_3, and a fourth secondary trigger signal outputting terminal CTV_4 of the trigger signal controller, where, MP11 and MP12 represent the first PMOS transistor and the second PMOS transistor of the first trigger controlling unit 217a respectively, and MN11-MN18 represent the first NMOS transistor to the eighth NMOS transistor of the first trigger controlling unit 217a respectively; MP21 and MP22 represent the first PMOS transistor and the second PMOS transistor of the second trigger controlling unit 217b respectively, and MN21-MN28 represent the first NMOS transistor to the eighth NMOS transistor of the second trigger controlling unit 217b respectively.

Figure 9B:
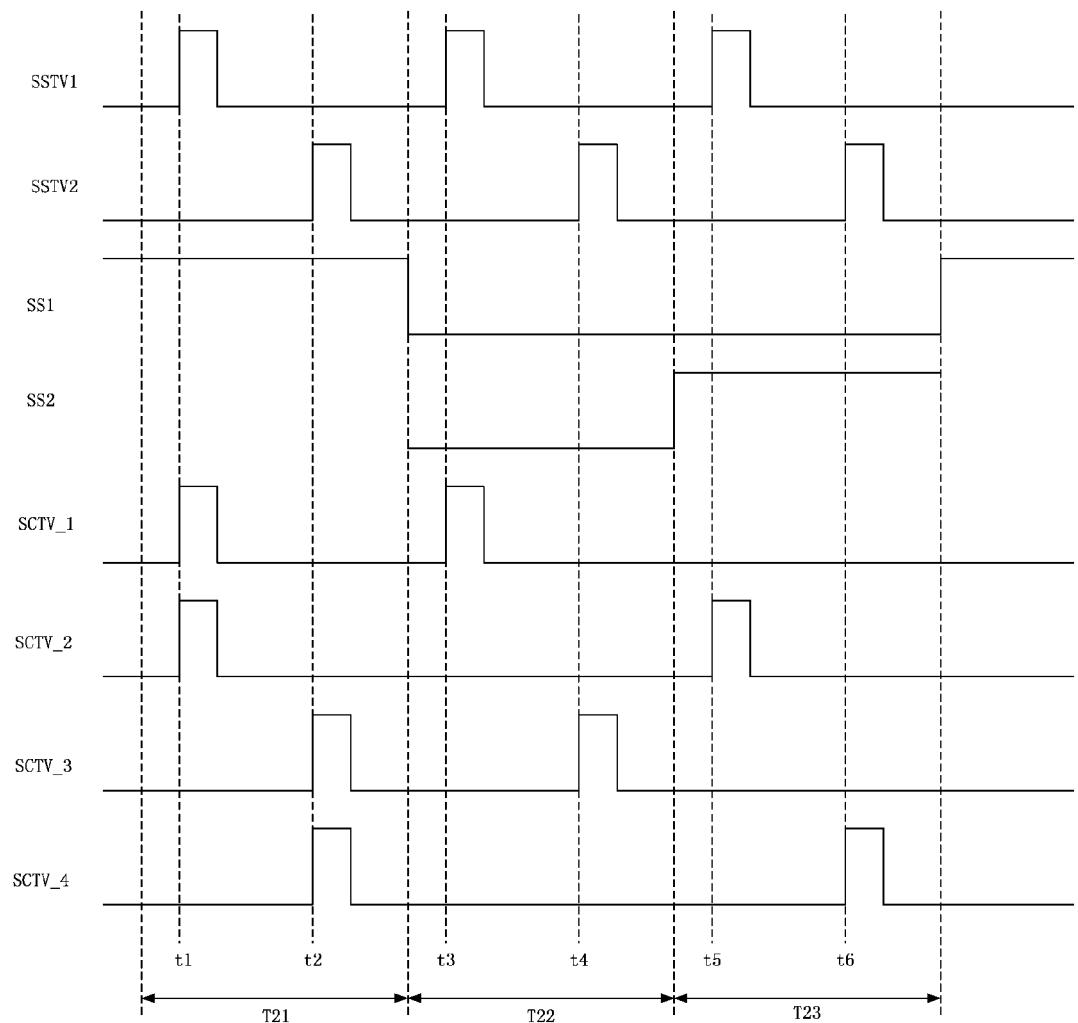
FIG. 9B is a timing diagram of various signals shown in FIG. 9A.

FIG. 9B is a timing diagram of various signals shown in FIG. 9A. In FIG. 9B, SSTV1 represents the first primary trigger signal inputted in the trigger signal controller; SSTV2 represents the second primary trigger signal inputted in the trigger signal controller; SS1 represents the first control signal inputted in the trigger signal controller; SS2 represents the second control signal inputted in the trigger signal controller; SCTV_1-SCTV_4 respectively represent the first secondary trigger signal to the fourth secondary trigger signal outputted in the trigger signal controller. It is noted that the first primary trigger signal SSTV1 and the second primary trigger signal SSTV2 inputted in the trigger signal controller refer to active primary trigger signals, i.e. in FIG. 9B, the active first primary trigger signal SSTV1 is a first primary trigger signal SSTV1 in a high level status and the active second primary trigger signal SSTV2 is a second primary trigger signal SSTV2 in a high level status. The operating principle of the trigger signal controller in FIG. 9A is further illustrated below in combination with FIG. 9B.

As shown in FIGS. 9A and 9B, operating states of the trigger signal controller comprise:

In the picture display phase T21 under the first display mode, at a first moment t1, a first primary trigger signal SSTV1 (corresponding to the first primary trigger signal SSTV1 having a high level) is inputted at the first primary trigger signal inputting terminal STV1, and a second primary trigger signal SSTV2 (corresponding to the second primary trigger signal SSTV2 having a low level) is not inputted at the second primary trigger signal inputting terminal; a first control signal SS1 having a high level is applied to the first control signal inputting terminal S1, and the second control signal inputting terminal S2 of the trigger signal controller is floated, so that both the third NMOS transistor MN13 and the fourth NMOS transistor MN14 of the first trigger signal controlling unit 217a are turned on, the first primary trigger signal SSTV1 is transmitted to the second secondary trigger signal outputting terminal CTV_2 of the trigger signal controller via the third NMOS transistor MN13 to output as a second secondary trigger signal SCTV_2, and the first primary trigger signal SSTV1 is transmitted to the first secondary trigger signal outputting terminal CTV_1 of the trigger signal controller via the third NMOS transistor MN13 and the fourth NMOS transistor MN14 to output as a first secondary trigger signal SCTV_1; at a second moment t2, a first primary trigger signal SSTV1 (corresponding to the first primary trigger signal SSTV1 having a low level) is not inputted at the first primary trigger signal inputting terminal STV1, and a second primary trigger signal SSTV2 (corresponding to the second primary trigger signal SSTV2 having a high level) is inputted at the second primary trigger signal inputting terminal STV2; a first control signal SS1 having a high level is applied to the first control signal inputting terminal S1 of the trigger signal controller, and the second control signal inputting terminal S2 of the trigger signal controller is floated, so that both the third NMOS transistor MN23 and the fourth NMOS transistor MN24 of the second trigger signal controlling unit 217b are turned on, and the second primary trigger signal SSTV2 is transmitted to the fourth secondary trigger signal outputting terminal CTV_4 of the trigger signal controller via the third NMOS transistor MN23 to output as a fourth secondary trigger signal SCTV_4, and the second primary trigger signal SSTV2 is transmitted to the third secondary trigger signal outputting terminal CTV_3 of the trigger signal controller via the third NMOS transistor MN23 and the fourth NMOS transistor MN24 to output as a third secondary trigger signal SCTV_3, where, the first moment is anterior to the second moment.

In the first picture displaying phase T22 under the second display mode, at a third moment t3, a first primary trigger signal SSTV1 (corresponding to the first primary trigger signal SSTV1 having a high level) is inputted at the first primary trigger signal inputting terminal STV1, and a second primary trigger signal SSTV2 (corresponding to the second primary trigger signal SSTV2 having a low level) is not inputted at the second primary trigger signal inputting terminal STV2; a first control signal SS1 having a low level is applied to the first control signal inputting terminal S1 of the trigger signal controller, and a second control signal SS2 having a low level is applied to the second control signal inputting terminal S2 of the trigger signal controller, so that both the first PMOS transistor MP11 and the second PMOS transistor MP12 of the first trigger signal controlling unit 217a are turned on, and a high level received by the first level signal inputting terminal VGH is applied to the gate electrode of the seventh NMOS transistor MN17 of the first trigger signal controlling unit 217a via the first PMOS transistor MP11 and the second PMOS transistor MP12 to turn on the seventh NMOS transistor MN17, and then the first primary trigger signal SSTV1 is transmitted to the first secondary trigger signal outputting terminal CTV_1 of the trigger signal controller via the seventh NMOS transistor MN7 to output as a first secondary trigger signal SCTV_1; at a fourth moment t4, a first primary trigger signal SSTV1 (corresponding to the first primary trigger signal SSTV1 having a low level) is not inputted at the first primary trigger signal inputting terminal STV1, and a second primary trigger signal SSTV2 (corresponding to the second primary trigger signal SSTV2 having a high level) is inputted at the second primary trigger signal inputting terminal STV2; a first control signal SS1 having a low level is applied to the first control signal inputting terminal S1 of the trigger signal controller, and a second control signal SS2 having a low level is applied to the second control signal inputting terminal S2, so that both the first PMOS transistor MP21 and the second PMOS transistor MP22 of the second trigger signal controlling unit 217b are turned on, and a high level received by the first level signal inputting terminal VGH is applied to the gate electrode of the seventh NMOS transistor MN27 of the second trigger signal controlling unit 217b via the first PMOS transistor MP21 and the second PMOS transistor MP22 to turn on the seventh NMOS transistor MN27, and then the second primary trigger signal SSTV2 is transmitted to the third secondary trigger signal outputting terminal CTV_3 of the trigger signal controller via the seventh NMOS transistor MN27 to output as a third secondary trigger signal SCTV_3.

In the second picture displaying phase T23 under the second display mode, at a fifth moment t5, a first primary trigger signal SSTV1 (corresponding to the first primary trigger signal SSTV1 having a high level) is inputted at the first primary trigger signal inputting terminal STV1, and a second primary trigger signal SSTV2 (corresponding to the second primary trigger signal SSTV2 having a low level) is not inputted at the second primary trigger signal inputting terminal STV2; a first control signal SS1 having a low level is applied to the first control signal inputting terminal S1, and a second control signal SS2 having a high level is applied to the second control signal inputting terminal S2 of the trigger signal controller, so that the fifth NMOS transistor MN15 of the first trigger signal controlling unit 217a is turned on, and then the first primary trigger signal SSTV1 is transmitted to the second secondary trigger signal outputting terminal CTV_2 of the trigger signal controller via the fifth NMOS transistor MN15 to output as a second secondary trigger signal SCTV_2; and at a sixth moment t6, a first primary trigger signal SSTV1 (corresponding to the first primary trigger signal SSTV1 having a low level) is not inputted at the first primary trigger signal inputting terminal STV1, and a second primary trigger signal SSTV2 (corresponding to the second primary trigger signal SSTV2 having a high level) is inputted at the second primary trigger signal inputting terminal STV2; a first control signal SS1 having a low level is applied to the first control signal inputting terminal S1 of the trigger signal controller, and a second control signal SS2 having a high level is applied to the second control signal inputting terminal S2 of the trigger signal controller, so that the fifth NMOS transistor MN25 of the second trigger signal controlling unit 217b is turned on, and then the second primary trigger signal SSTV2 is transmitted to the fourth secondary trigger signal outputting terminal CTV_4 of the trigger signal controller via the fifth NMOS transistor MN25 to output as a fourth secondary trigger signal SCTV_4, where, the third moment, the fourth moment, the fifth moment, the sixth moment are posterior sequentially.

Figure 10:
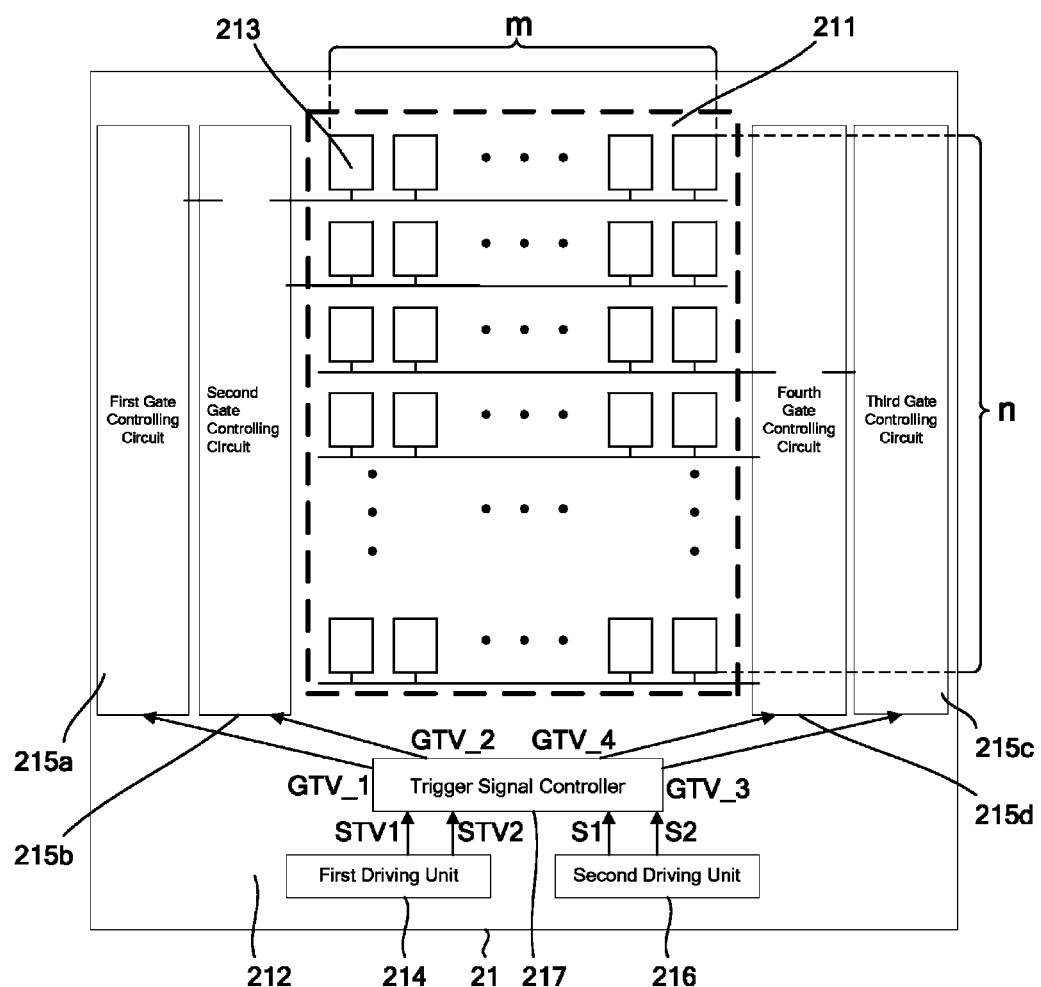
FIG. 10 is a schematic diagram of the structure of yet another display panel, according to embodiments of the disclosure.

In FIG. 9A, the trigger signal controller converts two primary trigger signal into four secondary trigger signals and output four secondary trigger signals, and thus the peripheral region includes four gate controlling circuits electrically connected with the trigger signal controller in the display panel 21 as shown in FIG. 10, i.e. a first gate controlling circuit 215a, a second gate controlling circuit 215b, a third gate controlling circuit 215c and a four gate controlling circuit 215d; the first gate controlling circuit 215a is configured to drive a group of pixels consisted of all of the first, fifth, ninth, . . . , (4k−3)-th, . . . , and (n−3)-th rows of pixels, the second gate controlling circuit 215b is configured to drive a group of pixels consisted of all of the second, sixth, tenth, . . . , (4k−2)-th, . . . , and (n−2)-th rows of pixels, the third gate controlling circuit 215c is configured to drive a group of pixels consisted of all of the third, seventh, eleventh, . . . , (4k−1)-th, . . . , and (n−1)-th rows of pixels, and the fourth gate controlling circuit 215d is configured to drive a group of pixels consisted of all of the fourth, eighth, twelfth, . . . , 4k-th, . . . , and n-th rows of pixels, wherein, k is a positive integer, and 1≤k≤n/4; the first gate controlling circuit 215a is driven by the first secondary trigger signal of the trigger signal controller (outputted by the first secondary trigger signal outputting terminal CTV_1 in Figures), the second gate controlling circuit 215b is driven by the second secondary trigger signal of the trigger signal controller (outputted by the second secondary trigger signal outputting terminal CTV_2 in Figures), the third gate controlling circuit 215c is driven by the third secondary trigger signal of the trigger signal controller (outputted by the third secondary trigger signal outputting terminal CTV_3 in Figures), and the fourth gate controlling circuit 215d is driven by the fourth secondary trigger signal of the trigger signal controller (outputted by the fourth secondary trigger signal outputting terminal CTV_4 in Figures).

It is noted that the distribution cases of the group of pixels consisting of all of the first, fifth, ninth, . . . , (4k−3)-th, . . . , and (n−3)-th rows of pixels, the group of pixels consisting of all of the second, sixth, tenth, . . . , (4k−2)-th, . . . , and (n−2)-th rows of pixels, the group of pixels consisting of all of the third, seventh, eleventh, . . . , (4k−1)-th, . . . , and (n−1)-th rows of pixels and the group of pixels consisting of all of the fourth, eighth, twelfth, . . . , 4k-th, . . . , and n-th rows of pixels in the display region of the display panel may refer to FIG. 4B and related descriptions, which is not repeatedly discussed herein again.

Additionally, the gate controlling circuit disposed corresponding to the trigger signal controller in FIG. 9A does not add additional circuit leads, and thus does not increase border area in the peripheral region of the display panel.

Further, operating states of the gate controlling circuit (corresponding to operating states of the trigger signal controller in FIG. 9B) include that:

In the picture displaying phase T21 under the first display mode, the first secondary trigger signal and the second secondary trigger signal generated at the first moment t1 by the trigger signal controller simultaneously enable the first gate controlling circuit 215a and the second gate controlling circuit 215b, respectively, to drive two adjacent rows of pixels among the two groups of pixels respectively electrically connected with the first gate controlling circuit 215a and the second gate controlling circuit 215b to display the same picture under the first display mode; the third secondary trigger signal and the fourth secondary trigger signal generated at the second moment t2 by the trigger signal controller simultaneously enable the third gate controlling circuit 215c and the fourth gate controlling circuit 215d, respectively, to drive two adjacent rows of pixels among the two groups of pixels respectively electrically connected with the third gate controlling circuit 215c and the fourth gate controlling circuit 215d to display the same picture under the first display mode.

The first gate controlling circuit 215a sequentially drives a first row of pixels, a fifth row of pixels, a ninth row of pixels and so on (i.e. the (4k−3)-th row of pixels), the second gate controlling circuit 215b sequentially drives a second row of pixels, a sixth row of pixels, a tenth row of pixels and so on (i.e. the (4k−2)-th row of pixels), the third gate controlling circuit 215c sequentially drives a third row of pixels, a seventh row of pixels, a eleventh row of pixels and so on (i.e. the (4k−1)-th row of pixels), the fourth gate controlling circuit 215d sequentially drives a fourth row of pixels, a eighth row of pixels, a twelfth row of pixels and so on (i.e. the 4k-th row of pixels). Since the first secondary trigger signal for driving the first gate controlling circuit 215a and the second secondary trigger signal for driving the second gate controlling circuit 215b are generated simultaneously at the first moment t1, the first gate controlling circuit 215a drives the first row of pixels and the second gate controlling circuit 215b drives the second row of pixels and the first gate controlling circuit 2151 and the second gate controlling circuit 2152 input the same data signal to the first row of pixels and the second row of pixels to display the same picture under the first display mode; since the third secondary trigger signal for driving the third gate controlling circuit 215c and the fourth secondary trigger signal for driving the fourth gate controlling circuit 215d are generated simultaneously at the first moment t2, the third gate controlling circuit 215c drives the third row of pixels and the fourth gate controlling circuit 215d drives the fourth row of pixels and the third gate controlling circuit 215c and the fourth gate controlling circuit 215d input the same data signal to the third row of pixels and the fourth row of pixels to display the same picture under the first display mode; then the first gate controlling circuit 215a drives the fifth row of pixels and the second gate controlling circuit 215b drives the sixth row of pixels, and then the third gate controlling circuit 215c drives the seventh row of pixels and the fourth gate controlling circuit 215d drives the eighth row of pixels; drive is performed sequentially until all of rows of pixels have been driven and a frame of picture under the first display mode has been displayed. As described above, two adjacent rows of pixels among the two groups of pixels respectively electrically connected with the first gate controlling circuit 215a and the second gate controlling circuit 215b display the same picture under the first display mode, two adjacent rows of pixels among the two groups of pixels respectively electrically connected with the third gate controlling circuit 215c and the fourth gate controlling circuit 215d display the same picture under the first display mode and thus the resolution of the display panel under the first display mode is m×n/2.

Under the first display mode, the first gate controlling circuit 215a and the second gate controlling circuit 215b initially simultaneously drive the first row of pixels and the second row of pixels respectively, and then simultaneously drive the firth row of pixels and the sixth row of pixels respectively, and sequentially, simultaneously drive next two corresponding adjacent rows of pixels, and so on; the third gate controlling circuit 215c and the fourth gate controlling circuit 215d initially simultaneously drive the third row of pixels and the fourth row of pixels respectively, and then simultaneously drive the seventh row of pixels and the eighth row of pixels respectively, and sequentially drive next two corresponding adjacent rows of pixels, and so on. It is noted that, under the first display mode, driving order of all pixels are that: simultaneously driving the first row of pixels and the second row of pixels, followed by simultaneously driving the third row of pixels and the fourth row of pixels, followed by simultaneously driving the fifth row of pixels and the sixth row of pixels, followed by simultaneously driving the seventh row of pixels and the eighth row of pixels, and sequentially, driving next two corresponding adjacent rows of pixels, and so on. The manner of achieving the above driving order of pixels under the first display mode is further illustrated below.

The first gate controlling circuit 215a and the second gate controlling circuit 215b are driven simultaneously at the first moment t1, and after delaying period t, the first row of pixels and the second row of pixels are driven simultaneously (i.e. at the moment (t1+t)); the third gate controlling circuit 215c and the fourth gate controlling circuit 215d are driven simultaneously at the second moment t2, and likewise, after delaying period t, the third row of pixels and the fourth row of pixels are driven simultaneously (i.e. at the moment (t2+t)), and thus it can be seen that a period between the first moment t1 and the second moment t2 is the same as a period between the moment when driving the first row of pixels and the moment when driving the third row of pixels (which is equivalent to a period between the moment when driving the first row of pixels and the moment when driving the fourth row of pixels, a period between the moment when driving the second row of pixels and the moment when driving the third row of pixels, and a period between the moment when driving the second row of pixels and the moment when driving the fourth row of pixels). In order to achieve the above driving order of the row of pixels under the first display mode, a period between the moments when driving two adjacent rows of pixels from the group of pixels including the first row of pixels, a period between the moments when driving two adjacent rows of pixels from the group of pixels including the second row of pixels, a period between the moments when driving two adjacent rows of pixels from the group of pixels including the third row of pixels, and a period between the moments when driving two adjacent rows of pixels from the group of pixels including the fourth row of pixels need to be larger than the period between the moment when driving the first row of pixels and the moment when driving the third row of pixels, i.e. larger than the period between the first moment t1 and the second moment t2. In other words, in order to achieve the above driving order of the pixels under the first display mode, a period between the moments when driving two adjacent rows of pixels from the group of pixels correspondingly driven by each of the first gate controlling circuit 215a, the second gate controlling circuit 215b, the third gate controlling circuit 215c and the fourth gate controlling circuit 215 is larger than the period between the first moment t1 and the second moment t2.

In the first picture displaying phase T22 under the second display mode, the first secondary trigger signal generated at the third moment t3 by the trigger signal controller enables the first gate controlling circuit 215a to drive the group of pixels electrically connected with the first gate controlling circuit 215a to display a first picture corresponding to the group of pixels; the third secondary trigger signal generated at the fourth moment t4 by the trigger signal controller enables the third gate controlling circuit 215c to drive the group of pixels electrically connected with the third gate controlling circuit 215c to display a first picture corresponding to the group of pixels; in the second picture displaying phase T23 under the second display mode, the second secondary trigger signal generated at the fifth moment t5 by the trigger signal controller enables the second gate controlling circuit 215b to drive the group of pixels electrically connected with the second gate controlling circuit 215b to display a second picture corresponding to the group of pixels; the fourth secondary trigger signal generated at the sixth moment t6 by the trigger signal controller enables the fourth gate controlling circuit 215d to drive the group of pixels electrically connected with the fourth gate controlling circuit 215d to display a second picture corresponding to the group of pixels.

In the first picture displaying phase T22 under the second display mode, since the first secondary trigger signal for driving the first gate controlling circuit 215a and the third secondary trigger signal for driving the third gate controlling circuit 215c are generated at the first moment t1 and the third moment t3 respectively, the first gate controlling circuit 215a sequentially drives the first row of pixels, the fifth row of pixels, the ninth row of pixels, the (4k−3)-th row of pixels, and so on (i.e. all of the (4k−3)-numbered rows of pixels), to display the first picture; the third gate controlling circuit 215c sequentially drives the third row of pixels, the seventh row of pixels, and the eleventh row of pixels the (4k−1)-th row of pixels, and so on (i.e. all of the (4k−1)-numbered rows of pixels), to display the first picture; in the second picture displaying phase T23 under the second display mode, since the second secondary trigger signal for driving the second gate controlling circuit 215b and the fourth secondary trigger signal for driving the fourth gate controlling circuit 215d are generated at the fifth moment t5 and the sixth moment t6 respectively, the second gate controlling circuit 215b sequentially drives the second row of pixels, the sixth row of pixels, the tenth row of pixels, the (4k−2)-th row of pixels, and so on (i.e. all of (4k−2)-numbered rows of pixels), to display the second picture; the fourth gate controlling circuit 215*d* sequentially drives the fourth row of pixels, the eighth row of pixels, and the twelfth row of pixels, the 4k-th row of pixels, and so on (i.e. all of 4k-numbered rows of pixels), to display the second picture. Since the first picture and the second picture have the same display content and hence together form the display picture under the second display mode, the resolution of the display panel under the second display mode is m×n/2, which is the same as that of the display panel under the first display mode. If the first display mode is a 2D display mode, and the second display mode is a 3D display mode, then the display panel, according to embodiments of the disclosure, can have the same resolution under the first display mode and the second display mode or under the 2D display mode and the 3D display mode.

In the first picture displaying phase T22, although the first gate controlling circuit 215*a* sequentially drives the first row of pixels, the fifth row of pixels and the ninth row of pixels . . . , the (4k−3)-th row of pixels and so on (i.e. all of (4k−3)-numbered rows of pixels) and also the third gate controlling circuit 215*c* sequentially drives the third row of pixels, the seventh row of pixels and the eleventh row of pixels, the (4k−1)-th row of pixels, and so on (i.e. all of (4k−1)-numbered rows of pixels), the driving order of the pixels in the first picture displaying phase T22 is sequentially as: the first row of pixels, the third row of pixels, the fifth row of pixels, the seventh row of pixels and so on, i.e, the incrementally odd-numbered rows of pixels. The manner of achieving the above driving order of pixels in the first picture displaying phase T22 is further illustrated below.

The first gate controlling circuit 215*a* is driven at the third moment t3, and after delaying period t', the first row of pixels is driven (i.e. at the moment (t3+t')); the third gate controlling circuit 215*c* is driven at the fourth moment t4, and likewise, after delaying period t', the third row of pixels is driven (i.e. at the moment (t4+t')). Therefore, it can be seen that a period between the third moment t3 and the fourth moment t4 is the same as a period between the moment when driving the first row of pixels and the moment when driving the third row of pixels. In order to achieve the above driving order of the pixels in the first picture displaying phase T22, a period between the moments when driving two adjacent rows of pixels from the group of pixels including the first row of pixels and a period between the moments when driving two adjacent rows of pixels from the group of pixels including the third row of pixels need to be larger than the period between the moment when driving the first row of pixels and the moment when driving the third row of pixels, i.e. larger than the period between the third moment t3 and the fourth moment t4. In other words, in order to achieve the above driving order of the pixels in the first picture displaying phase T22, a period between the moments when driving two adjacent rows of pixels from the group of pixels correspondingly driven by each of the first gate controlling circuit 215*a* and the third gate controlling circuit 215*c* is larger than the period between the third moment t3 and the fourth moment t4.

In the second picture displaying phase T23, although the second gate controlling circuit 215*b* sequentially drives the second row of pixels, the sixth row of pixels and the tenth row of pixels and so on (i.e. (4k−2)-th row of pixels) and the fourth gate controlling circuit 215*d* sequentially drives the fourth row of pixels, the eighth row of pixels and the twelfth row of pixels and so on (i.e. 4k-th row of pixels), the drive order of the pixels in the second picture displaying phase T22 is: even row of pixels such as the second row of pixels, the fourth row of pixels, the sixth row of pixels and the eighth row of pixels. According to related description of the drive order of pixels in the first picture displaying phase T22, similarly, in order to achieve drive order of the pixels in the second picture displaying phase T23, it is only needed that a period for which two adjacent rows of pixels from the group of pixels including the second row of pixels are driven and a period for which two adjacent rows of pixels from the group of pixels including the second row of pixels are driven are both larger than the period for which the second row of pixels and the fourth row of pixels are driven i.e. larger than the period between the fifth moment t5 and the sixth moment t6. In other words, in order to achieve the drive order of the pixels in the second picture displaying phase T23, the periods for which the second gate controlling circuit 215*b*, and the fourth gate controlling circuit 215*d* drive two adjacent rows of pixels from corresponding group of pixels, respectively are larger than the period between the fifth moment t5 and the sixth moment t6.

In embodiments of the disclosure, the scanning frequency of the display panel for the first picture and the second picture is at least 80 Hz. Since the scanning frequency of the picture under the second display mode is an average value between the scanning frequency of the first picture and the scanning frequency of the second picture, the higher scanning frequency of the first picture and the scanning frequency of the second picture results in the higher scanning frequency of the picture under the second display mode, thereby improving definition of the picture under the second display mode.

Figure 11:
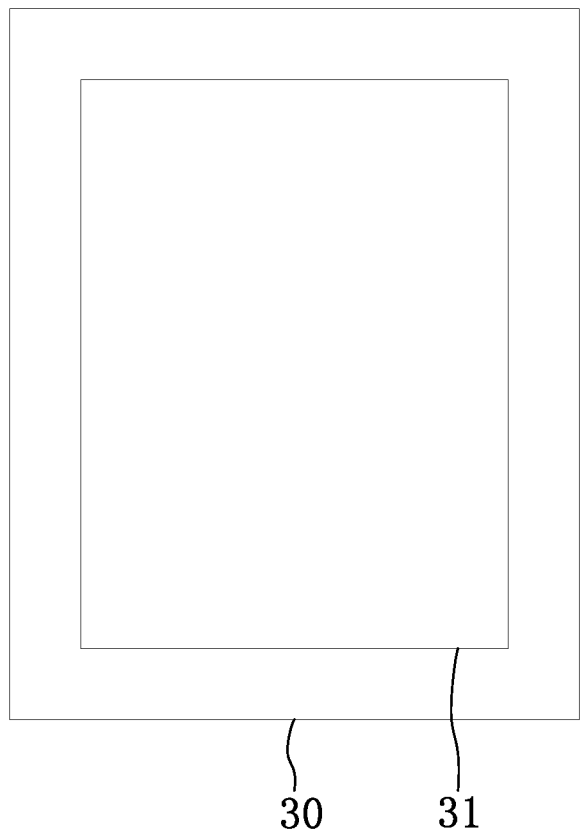
FIG. 11 is a schematic diagram of the structure of a display device, according to embodiments of the disclosure.

Embodiments of the disclosure provide a display device. FIG. 11 is a schematic diagram showing the structure of a display device, according to embodiments of the disclosure. Referring to FIG. 11, the display device 30 includes a display panel 31, and can further include other devices for supporting the display device 30. The display panel 31 is the display panel described in the above embodiments. The display device 60 may be a cellphone, a desktop computer, a notebook and a tablet computer and so on.

With the display panel and the display device, according to embodiments of the disclosure, by providing the trigger signal controller in the display panel, in the case that the primary trigger signal is generated by an ordinary integrated controlling circuit, the trigger signal controller can convert N primary trigger signals into 2N secondary trigger signals, these secondary trigger signals can enable the gate controlling circuits to drive corresponding groups of pixels, and the gate controlling circuits simultaneously drive two paired groups of pixels under a first display mode and alternately drive two paired groups of pixels under a second display mode, so that it the display panel can have the same resolution under the first display mode and the second display mode.

It is noted that the embodiments and the applied technology principles of the present disclosure are described as above. It should be understood for those skilled in the art that the disclosure is not limited to particular embodiments described herein. Various apparent changes, readjustment and alternative can be made by those skilled in the art without departing the scope of protection of the disclosure. Therefore, although the disclosure is illustrated in detail through the above embodiments, the disclosure is not limited to the above embodiments, and can further include other embodiments without departing from the conception of the disclosure.

Various modifications and additions can be made to the exemplary embodiments discussed without departing from the scope of the disclosure. For example, while the embodiments described above refer to particular features, the scope of the disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:

1. A display panel, comprising: a display region and a peripheral region surrounding the display region, wherein, the display region comprises pixels arranged in an n×m array for displaying a picture, wherein n and m both are positive integers, the peripheral region comprises a first driving circuit, gate controlling circuits, a second driving circuit and a trigger signal controller;

the first driving circuit is configured to generate N primary trigger signals, wherein N is a positive integer;

the second driving circuit is configured to generate a display control signal, and further configured to provide a corresponding data signal for each row of pixels;

the trigger signal controller is configured to convert the N primary trigger signals generated by the first driving circuit into 2N secondary trigger signals according to the display control signal, and sequentially outputting the 2N secondary trigger signals to 2N gate controlling circuits, each of the 2N gate controlling circuits is configured to drive a group of pixels in the display region, wherein, rows of pixels respectively from different groups of pixels are alternately arranged, the secondary trigger signals control gate controlling circuits to simultaneously drive two rows of pixels respectively from different groups of pixels under a first display mode, and alternately drive two rows of pixels respectively from different groups of pixels under a second display mode;

wherein the display control signal comprises a first control signal and a second control signal;

the trigger signal controller comprises N trigger signal controlling units, and the N primary trigger signals are each converted into the corresponding 2N secondary trigger signals by the trigger signal controlling units, respectively, according to the first control signal and the second control signal, wherein, the trigger signal controlling unit comprises: a first control signal inputting terminal configured to input the first control signal, a second control signal inputting terminal configured to input the second control signal, a primary trigger signal inputting terminal configured to input the primary trigger signal, a first secondary trigger signal outputting terminal configured to output a first secondary trigger signal and a second secondary trigger signal outputting terminal configured to output a second secondary trigger signal;

whenever N is larger than 1, the first control signal inputting terminal of each of the trigger signal controlling units is electrically connected together with each other to function as a first control signal inputting terminal of the trigger signal controller, and the second control signal inputting terminal of each of the trigger signal controlling units is electrically connected together with each other to function as a second control signal inputting terminal of the trigger signal controller; and the primary trigger signal inputting terminal of each of the trigger signal controlling units functions as a corresponding primary trigger signal inputting terminal of the trigger signal controller, and the first secondary trigger signal outputting terminal and the second secondary trigger signal outputting terminal of each of the trigger signal controlling units function as a corresponding secondary trigger signal outputting terminals of the trigger signal controller, respectively.

2. The display panel of claim 1, wherein each of the trigger signal controlling units further comprises: a first PMOS transistor, a second PMOS transistor, a first NMOS transistor, a second NMOS transistor, a third NMOS transistor, a fourth NMOS transistor, a fifth NMOS transistor, a sixth NMOS transistor, a seventh NMOS transistor, an eighth NMOS transistor, a first level signal inputting terminal configured to receive a high level signal and a second level signal inputting terminal configured to receive a low level signal;

a gate electrode of the first PMOS transistor is electrically connected with the first control signal inputting terminal, a source electrode of the first PMOS transistor is electrically connected with the first level signal inputting terminal, and a drain electrode of the first PMOS transistor is electrically connected with a source electrode of the second PMOS transistor;

a gate electrode of the second PMOS transistor is electrically connected with the second control signal inputting terminal, and a drain electrode of the second PMOS transistor is electrically connected with a drain electrode of the first NMOS transistor;

a gate electrode of the first NMOS transistor is electrically connected with the first control signal inputting terminal, and a source electrode of the first NMOS transistor is electrically connected with the second level signal inputting terminal;

a gate electrode of the second NMOS transistor is electrically connected with the second control signal inputting terminal, a drain electrode of the second NMOS transistor is electrically connected with the drain electrode of the first NMOS transistor, and a source electrode of the second NMOS transistor is electrically connected with the second level signal inputting terminal;

a gate electrode of the third NMOS transistor is electrically connected with the first control signal inputting terminal, a source electrode of the third NMOS transistor is electrically connected with the second secondary trigger signal outputting terminal, and a drain electrode of the third NMOS transistor is electrically connected with the primary trigger signal inputting terminal;

a gate electrode of the fourth NMOS transistor is electrically connected with the first control signal inputting terminal, a source electrode of the fourth NMOS transistor is electrically connected with the first secondary trigger signal outputting terminal, and a drain electrode of the fourth NMOS transistor is electrically connected with the second secondary trigger signal outputting terminal;

a gate electrode of the fifth NMOS transistor is electrically connected with the second control signal inputting terminal, a source electrode of the fifth NMOS transistor is electrically connected with the second secondary trigger signal outputting terminal, and a drain electrode of the fifth NMOS transistor is electrically connected with the primary trigger signal inputting terminal;

a gate electrode of the sixth NMOS transistor is electrically connected with the drain electrode of the first NMOS transistor, a source electrode of the sixth NMOS transistor is electrically connected with the second level signal inputting terminal, and a drain electrode of the sixth NMOS transistor is electrically connected with the second secondary trigger signal outputting terminal;

a gate electrode of the seventh NMOS transistor is electrically connected with the drain electrode of the first NMOS transistor, a source electrode of the seventh NMOS transistor is electrically connected with the first secondary trigger signal outputting terminal, and a drain electrode of the seventh NMOS transistor is electrically connected with the primary trigger signal inputting terminal; and a gate electrode of the eighth NMOS transistor is electrically connected with the second control signal inputting terminal, a source electrode of the eighth NMOS transistor is electrically connected with the second level signal inputting terminal, and a drain electrode of the eighth NMOS transistor is electrically connected with the first secondary trigger signal outputting terminal.

3. The display panel of claim 2, wherein the trigger signal controller comprises one trigger signal controlling unit wherein;

operating states of the trigger signal controller comprise:

in a picture displaying phase under a first display mode, a first control signal having a high level is applied to the first control signal inputting terminal of the trigger signal controller, and the second control signal inputting terminal of the trigger signal controller is floated, so that both the third NMOS transistor and the fourth NMOS transistor are turned on, the primary trigger signal is transmitted to the second secondary trigger signal outputting terminal via the third NMOS transistor to output as a second secondary trigger signal, and the primary trigger signal is transmitted to the first secondary trigger signal outputting terminal via both the third NMOS transistor and the fourth NMOS transistor to output as a first secondary trigger signal;

in a first picture displaying phase under a second display mode, a first control signal having a low level is applied to the first control signal inputting terminal of the trigger signal controller, and a second control signal having a low level is applied to the second control signal inputting terminal of the trigger signal controller, so that both the first PMOS transistor and the second PMOS transistor are turned on, the high level signal received by the first level signal inputting terminal is applied to the gate electrode of the seventh NMOS transistor via both the first PMOS transistor and the second PMOS transistor to turn on the seventh NMOS transistor, and the primary trigger signal is transmitted to the first secondary trigger signal outputting terminal via the seventh NMOS transistor to output as a first secondary trigger signal; and in a second picture displaying phase under the second display mode, a first control signal having a low level is applied to the first control signal inputting terminal of the trigger signal controller, and a second control signal having a high level is applied to the second control signal inputting terminal of the trigger signal controller, so that the fifth NMOS transistor is turned on, and the primary trigger signal is transmitted to the second secondary trigger signal outputting terminal via the fifth NMOS transistor to output as a second secondary trigger signal.

4. The display panel of claim 3, wherein the peripheral region comprises two gate controlling circuits comprising a first gate controlling circuit and a second gate controlling circuit;

the first gate controlling circuit is configured to drive a group of pixels consisted of all of the first, third, . . . , (2i−1)-th, . . . , and (n−1)-th rows of pixels, and the second gate controlling circuit is configured to drive a group of pixels consisted of all of the second, fourth, . . . , 2i-th, . . . , and n-th rows of pixels, wherein, i is a positive integer, and 1≤i≤n/2; and the first gate controlling circuit is driven by the first secondary trigger signal, and the second gate controlling circuit is driven by the second secondary trigger signal.

5. The display panel of claim 4, wherein operating states of the gate controlling circuit comprise:

in the picture displaying phase under the first display mode, the first secondary trigger signal and the second secondary trigger signal generated by the trigger signal controller simultaneously enable the first gate controlling circuit and the second gate controlling circuit, respectively, to drive the (2i−1)-th row and the 2i-th row of pixels among the two groups of pixels respectively electrically connected with the first gate controlling circuit and the second gate controlling circuit to display the same picture under the first display mode;

in the first picture displaying phase under the second display mode, the first secondary trigger signal generated by the trigger signal controller enables the first gate controlling circuit to drive the group of pixels electrically connected with the first gate controlling circuit to display a first picture; and in the second picture displaying phase under the second display mode, the second secondary trigger signal generated by the trigger signal controller enables the second gate controlling circuit to drive the group of pixels electrically connected with the second gate controlling circuit to display a second picture.

6. The display panel of claim 5, wherein a scanning frequency of the display panel under the second display mode is at least 80 Hz.

7. The display panel of claim 2, wherein, the trigger signal controller comprises two trigger signal controlling units comprising a first trigger signal controlling unit and a second trigger signal controlling unit, wherein a primary trigger signal inputting terminal of the first trigger signal controlling unit and a primary trigger signal inputting terminal of the second trigger signal controlling unit function as a first primary trigger signal inputting terminal and a second primary trigger signal inputting terminal of the trigger signal controller, respectively, and two secondary trigger signal outputting terminals of the first trigger signal controlling unit and two secondary trigger signal outputting terminals of the second trigger signal controlling unit sequentially function as a first secondary trigger signal outputting terminal, a second secondary trigger signal outputting terminal, a third secondary trigger signal outputting terminal and a fourth secondary trigger signal outputting terminal, of the trigger signal controller, respectively;

operating states of the trigger signal controller comprise:
in a picture displaying phase under a first display mode, at a first moment, a first primary trigger signal is inputted at the first primary trigger signal inputting terminal, and a second primary trigger signal is not inputted at the second primary trigger signal inputting terminal; a first control signal having a high level is applied to the first control signal inputting terminal, and the second control signal inputting terminal of the trigger signal controller is floated, so that both the third NMOS transistor and the fourth NMOS transistor of the first trigger signal controlling unit are turned on, the first primary trigger signal is transmitted to the second secondary trigger signal outputting terminal of the trigger signal controller via the third NMOS transistor to output as a second secondary trigger signal, and the first primary trigger signal is transmitted to the first secondary trigger signal outputting terminal of the trigger signal controller via the third NMOS transistor and the fourth NMOS transistor to output as a first secondary trigger signal; and at a second moment, a first primary trigger signal is not inputted at the first primary trigger signal inputting terminal, and a second primary trigger signal is inputted at the second primary trigger signal inputting terminal; a first control signal having a high level is applied to the first control signal inputting terminal of the trigger signal controller, and the second control signal inputting terminal of the trigger signal controller is floated, so that both the third NMOS transistor and the fourth NMOS transistor of the second trigger signal controlling unit are turned on, and the second primary trigger signal is transmitted to the fourth secondary trigger signal outputting terminal of the trigger signal controller via the third NMOS transistor to output as a fourth secondary trigger signal, and the second primary trigger signal is transmitted to the third secondary trigger signal outputting terminal of the trigger signal controller via the third NMOS transistor and the fourth NMOS transistor to output as a third secondary trigger signal;

in a first picture displaying phase under a second display mode, at a third moment, a first primary trigger signal is inputted at the first primary trigger signal inputting terminal, and a second primary trigger signal is not inputted at the second primary trigger signal inputting terminal; a first control signal having a low level is applied to the first control signal inputting terminal of the trigger signal controller, and a second control signal having a low level is applied to the second control signal inputting terminal of the trigger signal controller, so that both the first PMOS transistor and the second PMOS transistor of the first trigger signal controlling unit are turned on, and a high level received by the first level signal inputting terminal is applied to the gate electrode of the seventh NMOS transistor of the first trigger signal controlling unit via the first PMOS transistor and the second PMOS transistor to turn on the seventh NMOS transistor, and then the first primary trigger signal is transmitted to the first secondary trigger signal outputting terminal of the trigger signal controller via the seventh NMOS transistor to output as a first secondary trigger signal; and at a fourth moment, a first primary trigger signal is not inputted at the first primary trigger signal inputting terminal, and a second primary trigger signal is inputted at the second primary trigger signal inputting terminal; a first control signal having a low level is applied to the first control signal inputting terminal of the trigger signal controller, and a second control signal having a low level is applied to the second control signal inputting terminal, so that both the first PMOS transistor and the second PMOS transistor of the second trigger signal controlling unit are turned on, and a high level received by the first level signal inputting terminal is applied to the gate electrode of the seventh NMOS transistor of the second trigger signal controlling unit via the first PMOS transistor and the second PMOS transistor to turn on the seventh NMOS transistor, and then the second primary trigger signal is transmitted to the third secondary trigger signal outputting terminal of the trigger signal controller via the seventh NMOS transistor to output as a third secondary trigger signal; and in a second picture displaying phase under the second display mode, at a fifth moment, a first primary trigger signal is inputted at the first primary trigger signal inputting terminal, and a second primary trigger signal is not inputted at the second primary trigger signal inputting terminal; a first control signal having a low level is applied to the first control signal inputting terminal, and a second control signal having a high level is applied to the second control signal inputting terminal of the trigger signal controller, so that the fifth NMOS transistor of the first trigger signal controlling unit is turned on, and then the first primary trigger signal is transmitted to the second secondary trigger signal outputting terminal of the trigger signal controller via the fifth NMOS transistor to output as a second secondary trigger signal; and at a sixth moment, a first primary trigger signal is not inputted at the first primary trigger signal inputting terminal, and a second primary trigger signal is inputted at the second primary trigger signal inputting terminal; a first control signal having a low level is applied to the first control signal inputting terminal of the trigger signal controller, and a second control signal having a high level is applied to the second control signal inputting terminal of the trigger signal controller, so that the fifth NMOS transistor of the second trigger signal controlling unit is turned on, and then the second primary trigger signal is transmitted to the fourth secondary trigger signal outputting terminal of the trigger signal controller via the fifth NMOS transistor to output as a fourth secondary trigger signal.

8. The display panel of claim 7, wherein the peripheral region comprises four gate controlling circuits comprising a first gate controlling circuit, a second gate controlling circuit, a third gate controlling circuit and a fourth gate controlling circuit;

the first gate controlling circuit is configured to drive a group of pixels consisted of all of the first, fifth, ninth, . . . , (4k−3)-th, . . . , and (n−3)-th rows of pixels, the second gate controlling circuit is configured to drive a group of pixels consisted of all of the second, sixth, tenth, . . . , (4k−2)-th, . . . , and (n−2)-th rows of pixels, the third gate controlling circuit is configured to drive a group of pixels consisted of all of the third, seventh, eleventh, . . . , (4k−1)-th, . . . , and (n−1)-th rows of pixels, and the fourth gate controlling circuit is configured to drive a group of pixels consisted of all of the fourth, eighth, twelfth, . . . , 4k-th, . . . , and n-th rows of pixels, wherein, k is a positive integer, and 1≤k≤n/4; and the first gate controlling circuit is driven by the first secondary trigger signal of the trigger signal controller, the second gate controlling circuit is driven by the second secondary trigger signal of the trigger signal controller, the third gate controlling circuit is driven by the third secondary trigger signal of the trigger signal controller, and the fourth gate controlling circuit is driven by the fourth secondary trigger signal of the trigger signal controller.

9. The display panel of claim 8, wherein operating states of the gate controlling circuit comprise:

in the picture displaying phase under the first display mode, the first secondary trigger signal and the second secondary trigger signal generated at the first moment by the trigger signal controller simultaneously enable the first gate controlling circuit and the second gate controlling circuit, respectively, to drive two adjacent rows of pixels among the two groups of pixels respectively electrically connected with the first gate controlling circuit and the second gate controlling circuit to display the same picture under the first display mode; and the third secondary trigger signal and the fourth secondary trigger signal generated at the second moment by the trigger signal controller simultaneously enable the third gate controlling circuit and the fourth gate controlling circuit, respectively, to drive two adjacent rows of pixels among the two groups of pixels respectively electrically connected with the third gate controlling circuit and the fourth gate controlling circuit to display the same picture under the first display mode;

in the first picture displaying phase under the second display mode, the first secondary trigger signal generated at the third moment by the trigger signal controller enables the first gate controlling circuit to drive the group of pixels electrically connected with the first gate controlling circuit to display a first picture corresponding to the group of pixels; and the third secondary trigger signal generated at the fourth moment by the trigger signal controller enables the third gate controlling circuit to drive the group of pixels electrically connected with the third gate controlling circuit to display a first picture corresponding to the group of pixels; and in the second picture displaying phase under the second display mode, the second secondary trigger signal generated at the fifth moment by the trigger signal controller enables the second gate controlling circuit to drive the group of pixels electrically connected with the second gate controlling circuit to display a second picture corresponding to the group of pixels; and the fourth secondary trigger signal generated at the sixth moment by the trigger signal controller enables the fourth gate controlling circuit to drive the group of pixels electrically connected with the fourth gate controlling circuit to display a second picture corresponding to the group of pixels.

10. The display panel of claim 9, wherein:

the first moment is anterior to the second moment; and the third moment, the fourth moment, the fifth moment, and the sixth moment are posterior sequentially.

11. The display panel of claim 9, wherein, in the picture display phase under the first display mode, a period between the moments when driving two adjacent rows of pixels from the group of pixels correspondingly driven by each of the first gate controlling circuit, the second gate controlling circuit, the third gate controlling circuit and the fourth gate controlling circuit is larger than a period between the first moment and the second moment.

12. The display panel of claim 9, wherein:

in the first picture display phase under the second display mode, a period between the moments when driving two adjacent rows of pixels from the group of pixels correspondingly driven by each of the first gate controlling circuit and the third gate controlling circuit is larger than a period between the third moment and the fourth moment; and in the second picture display phase under the second display mode, a period between the moments when driving two adjacent rows of pixels from the group of pixels correspondingly driven by each of the second gate controlling circuit and the fourth gate controlling circuit is larger than a period between the fifth moment and the sixth moment.

13. The display panel of claim 9, wherein a scanning frequency under the second display mode at least 80 Hz.

14. The display panel of claim 7, wherein:

the first moment is anterior to the second moment; and the third moment, the fourth moment, the fifth moment, and the sixth moment are posterior sequentially.

15. The display panel of claim 1, wherein the first display mode is a 2D display mode and the second display mode is a 3D display mode.

16. The display panel of claim 1, wherein the first control signal is a 2D/3D control signal and the second control signal is a left/right eye control signal.

* * * * *